(12) United States Patent
Takahata

(10) Patent No.: US 7,498,802 B2
(45) Date of Patent: Mar. 3, 2009

(54) FLEXIBLE INDUCTIVE SENSOR

(75) Inventor: Kenichi Takahata, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 124 days.

(21) Appl. No.: 11/456,443

(22) Filed: Jul. 10, 2006

(65) Prior Publication Data

US 2008/0007253 A1     Jan. 10, 2008

(51) Int. Cl.
G01B 7/14 (2006.01)
G01R 33/05 (2006.01)

(52) U.S. Cl. .................. 324/207.15; 324/249

(58) Field of Classification Search ........... 331/181; 334/65–77; 336/120, 122, 130, 135; 324/207.15, 324/234, 239, 244, 257–258, 260, 654, 249
See application file for complete search history.

(56) References Cited

U.S. PATENT DOCUMENTS

| | | | |
|---|---|---|---|
| 4,520,885 A | 6/1985 | Jeffrey | |
| 4,658,153 A | 4/1987 | Brosh et al. | |
| 5,181,423 A | 1/1993 | Philipps et al. | |
| 5,504,425 A | 4/1996 | Fericean et al. | |
| 5,608,739 A | 3/1997 | Snodgrass et al. | |
| 6,025,725 A | 2/2000 | Gershenfeld et al. | |
| 6,184,755 B1 * | 2/2001 | Barber et al. | 331/181 |
| 6,201,980 B1 | 3/2001 | Darrow et al. | |
| 6,574,166 B2 | 6/2003 | Niemiec | |
| 6,630,887 B2 | 10/2003 | Lake | |
| 6,720,866 B1 | 4/2004 | Sorrells et al. | |
| 6,753,783 B2 | 6/2004 | Friedman et al. | |
| 6,774,800 B2 | 8/2004 | Friedman et al. | |
| 2001/0016683 A1 | 8/2001 | Darrow et al. | |
| 2002/0175182 A1 | 11/2002 | Matthews | |
| 2003/0163287 A1 | 8/2003 | Vock et al. | |
| 2004/0089058 A1 | 5/2004 | De Haan et al. | |
| 2005/0141591 A1 | 6/2005 | Sakano | |
| 2005/0223841 A1 | 10/2005 | Lee | |
| 2007/0208542 A1 | 9/2007 | Vock et al. | |

FOREIGN PATENT DOCUMENTS

| | | |
|---|---|---|
| WO | WO 03/044521 | 5/2003 |
| WO | WO 2004/015624 | 2/2004 |
| WO | WO 2004/078787 | 9/2004 |
| WO | WO 2005/059859 | 6/2005 |

(Continued)

OTHER PUBLICATIONS

U.S. Appl. No. 11/383,640, filed May 16, 2006 entitled "Systems and Methods for Remote Sensing Using Inductively Coupled Transducers".

(Continued)

*Primary Examiner*—Bot LeDynh
(74) *Attorney, Agent, or Firm*—Robert S. Moshrefzadeh

(57) ABSTRACT

An inductive sensor includes an inductor comprising conductive loops and at least one hinge mechanically coupling the loops. Operation of the hinge changes the position of the loops and causes a change in the inductance of the sensor. A sensor material may be oriented with respect to the loops so that a dimensional change of the sensor material operates the hinge and causes the change in the position of the loops.

30 Claims, 20 Drawing Sheets

FOREIGN PATENT DOCUMENTS

WO     WO 2006/010108     1/2006

OTHER PUBLICATIONS

U.S. Appl. No. 11/383,652, filed May 16, 2006 entitled "Spatially Distributed Remote Sensor".

Arndt, et al., "Poly(vinyl alcohol)/poly(acrylic acid) hydrogels: FT-IR spectroscopic characterization of crosslinking reaction and work at transition point", *Acta Polym.* (1999) 50, pp. 383-390.

Baldi, et al, "A Self-Resonant Frequency-Modulated Micromachined Passive Pressure Transensor", *IEEE Sensors Journal*, vol. 3, No.6, (Dec. 2003) pp. 728-733.

Gerlach, et al., "Chemical and pH sensors based on the swelling behavior of hydrogels", *Sensors and Actuators B* 111-112 (2005) pp. 555-561.

Herber, et al., "Exploitation of a pH-sensitive hydrogel disk for CO2 detection", *Sensors and Actuators B* 103 (2004) pp. 284-289.

Lei, et al., "A Hydrogel-based Wireless Chemical Sensor", *IEEE* (2004) pp. 391-394.

Oshiro, et al., "A Novel Miniature Planar Inductor", *IEEE Transactions of Magnetics*, vol. Mag-23, No. 5 (Sep. 1987) pp. 3759-3761.

Strong, et al., Hydrogel-Actuated Capacitive Transducer for Wireless Biosensors, *Biomedical Microdevices* 4:2 (2002) pp. 97-103.

Suh, et al., "Design Optimization and Experimental Verification of Wireless IDT Based Micro Temperature Sensor", *Smart Mater. Struct.*, 9 (2000) pp. 890-897.

Velten, et al., "Micro-coil with movable core for application in an inductive displacement sensor", *J. Micromech. Microeng.* 9 (1999) pp. 119-122.

Yokoyama, et al., "On-Chip Variable Inductor Using Microelectromechanical Systems Technology", *Jpn. J. Appl. Phys.*, 42 (2003) pp. 2190-2192.

Zine-El-Abidine, et al., "Tunable Radio Frequency MEMS Inductors with Thermal Bimorph Actuators", *J. Micromech. Microeng.* 15 (2005) pp. 2063-2068.

\* cited by examiner

FLEXIBLE INDUCTIVE SENSOR

TECHNICAL FIELD

The present invention is related to an inductive sensor formed by conductive loops coupled by a flexible hinge and capable of sensing a parameter of interest.

BACKGROUND

A sensor translates a change in an external stimulus into a change in a detectable or measurable sensed parameter. In various implementations, sensors may be formed using passive electronic devices, such as inductors, capacitors and/or resistors. The circuit value of these sensors (e.g., inductance, capacitance, or resistance value) varies with a parameter of interest. These sensors may be incorporated into a sensor circuit so that the variation of the circuit value caused by the changing parameter of interest alters the sensor circuit output.

It is often desirable to remotely acquire sensor information. Radio frequency identification (RFID) circuitry has been used to detect the presence and movement of articles of interest. The remote access capabilities of RFID technology may be combined with sensor technology to provide remote sensing capability. The present invention fulfills these and other needs, and offers other advantages over the prior art.

SUMMARY

The present invention is directed to an inductive sensor responsive to a parameter of interest, the inductive sensor including conductive loops mechanically coupled by a hinge. One embodiment of the inductive sensor includes an inductor comprising conductive loops and associated with an inductance. One or more hinges mechanically couple one or more pairs of the loops. A sensor material configured to respond to a parameter of interest by a dimensional change of the sensor material is oriented with respect to the loops so that the dimensional change of the sensor material causes a change in position of at least a first one of the loops relative to at least a second one of the loops and produces a change in the inductance of the inductor. The parameter of interest may involve at least one of temperature, moisture, pH, fluid flow, salinity, solvent composition, glucose concentration, electric field, light, and ion concentration.

According to various aspects of the invention the loops may be disposed on a flexible substrate. The hinges may be formed by folds of a flexible material. In one implementation, the loops and hinges are disposed on a unitary substrate, with the hinges formed by thinned portions of the unitary substrate. A latching mechanism may be used to orient one loop at an initial angle with respect to another loop.

For example, the loops may be oriented in a substantially parallel configuration having a distance between each pair of parallel loops. The change in position involves a change in distance between the parallel loops. In another example, two of the loops may be oriented at an angle to one another. The change in position involves a change in the angle between the loops.

According to some configurations, the sensor material, such as hydrogel, is disposed between at least some of the loops. At least one of the loops may be disposed on a substrate having perforations configured to expose the sensor material to the parameter of interest.

The sensor may include a capacitor electrically coupled to the inductor to form a resonant circuit. A change in the parameter of interest causes a change in a resonance characteristic of the resonant circuit, such as the resonant frequency.

Another embodiment of a sensor includes an inductor comprising conductive loops, each conductive loop disposed on a planar substrate. One or more hinges mechanically couples at least one pair of the conductive loops. Operation of the hinge or hinges changes the angular orientation of the loops, causing a corresponding change in the inductance of the inductor. In some implementations, a sensor material configured to respond to a parameter of interest by a dimensional change of the sensor material is oriented with respect to the loops so that the dimensional change of the sensor material causes operation of the one or more hinges. According to one aspect of the invention, the sensor material is disposed between the conductive loops.

Another embodiment of the invention is directed to a sensor system. The system includes an inductive sensor having conductive loops which are associated with an inductance. One or more hinges mechanically couples one or more pairs of the loops. A sensor material configured to respond to a parameter of interest by a dimensional change of the sensor material is oriented with respect to the loops so that the dimensional change of the sensor material causes a change in position of at least a first one of the loops relative to at least a second one of the loops. The change in position produces a change in the inductance of the inductor. A capacitor is electrically coupled to the inductor to form a resonant circuit having one or more resonance characteristics dependent on the inductance. The sensor system also includes an interrogator, which may be wirelessly coupled to the inductive sensor. The interrogator is configured to detect a change in the resonance characteristics of the resonant circuit.

Yet another embodiment of the invention is directed to a method for making an inductive sensor. A first loop of electrically conductive material is formed on a first portion of a planar substrate, the substrate having at least a first portion, a second portion, and a hinge portion connecting the first and second portions. A second loop of electrically conductive material is formed on the second portion of the substrate, the second loop electrically coupled to the first loop. Sensor material is oriented with respect to the substrate, the sensor material configured to respond to a parameter of interest by a dimensional change of the sensor material. The substrate is folded at the hinge portion so that the sensor material is disposed between the first loop and the second loop and the first and second loops form coils of an inductor.

According to one aspect, the planar substrate includes holes, such as holes formed by perforation of the substrate. The holes allow exposure of the sensor material to the parameter of interest.

Electrodes may be formed on the planar substrate to create opposing plates of a capacitor when the planar substrate is folded. The capacitor is electrically coupled with the inductor to form a resonant circuit. For example, the opposing plates of the capacitor may be formed on opposing sides of the first or second portion of the substrate inside one of the loops. One or more of the opposing plates may be formed in sections to reduce eddy currents.

Additional loops of electrically conductive material may be formed on additional portions of the substrate so that each additional loop is electrically coupled to the first and second loops. The substrate may have additional hinge portions coupling the additional portion of the substrate. The substrate may be folded at the additional hinge portions, such as by fan-folding. The use of additional loops as described above forms a multi-turn inductor when the substrate is folded.

According to certain aspects of the invention, the planar substrate may comprise a polyimide and the sensor material may comprise hydrogel. The hinge portion may be formed by decreasing the thickness of the hinge portion to increase the flexibility of the hinge. Formation of the inductor loops may be accomplished using photolithographic process.

According to some aspects of the invention, a latching mechanism may be formed on the substrate. The latching mechanism can be engaged to latch the loops in an initial angular orientation after folding.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1A:
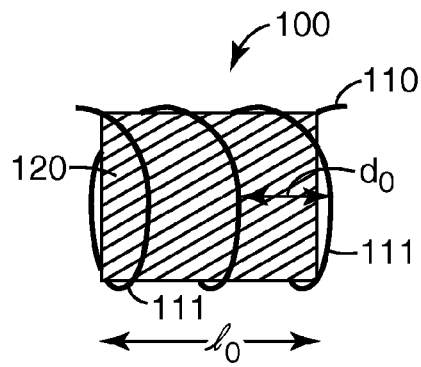
FIGS. 1A and 1B illustrate side and cross sectional views, respectively, of an inductive sensor incorporating a dimensionally responsive sensor material in an initial condition or prior to the change in the parameter of interest in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, reference is made to the accompanying drawings that form a part hereof, and in which are shown by way of illustration, various embodiments in which the invention may be practiced. It is to be understood that the embodiments may be utilized and structural changes may be made without departing from the scope of the present invention.

Embodiments of the present invention are directed to inductive sensors, circuits and systems incorporating inductive sensors, and processes for making and using inductive sensors. The approaches of the present invention involve an inductive sensor having an inductance value that is altered by a particular parameter or condition to which the sensor is exposed. In various implementations discussed herein, a change in the inductance value of the inductive sensor is caused by a change in an ambient or environmental condition or an analyte of interest. The inductance value may change upon exposure to or after a change in a particular analyte, for example. The parameter being detected or measured by the inductive sensor is also generally referred to herein as the sensed parameter or parameter of interest. A representative list of sensed parameters that may be detected, measured and/or monitored using an inductive sensor according to the embodiments described herein include temperature, moisture, pH, fluid flow, salinity, solvent composition, glucose concentration, electric field, light, and ion concentration, for example.

In certain implementations, the inductive sensor incorporates a sensor material oriented so that a dimensional change in the sensor material causes a dimensional change in the inductor. The dimensional change in the inductor causes the inductance value of the inductor to change. In some implementations, the inductive sensor includes at least two loops and a hinge that mechanically couples the loops. Operation of the hinge alters in the distance between the inductive loops and causes a corresponding change in the inductance of the inductor. In yet other implementations, sensor material that exhibits a dimensional change when exposed to a parameter of interest may be used in conjunction with a hinged inductive sensor.

In these and other implementations, the inductive sensor may be used as a component in a resonant circuit providing remote access to the sensor. A change in the inductance of the inductive sensor produces a corresponding change in a resonance characteristic of the resonant circuit. The change in the resonance characteristic may be wirelessly detected using an external interrogator.

Figure 1B:
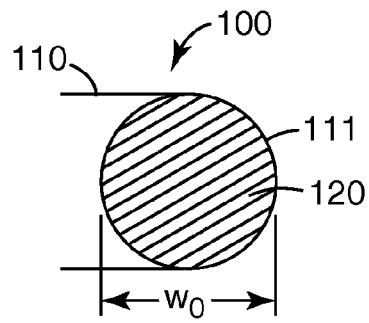

FIGS. 1A and 1B illustrate side and cross sectional views, respectively, of an inductive sensor 100 in accordance with one embodiment. The inductive sensor 100 includes an inductor 110 having one or more loops 111 and associated with an inductance value. The inductance value, L, of an inductor is generally a function of the magnetic permeability of the material coupling the inductor coils, the number of turns, the cross-sectional area of the inductor, and the length of the inductor.

The inductive sensor 110 includes a sensor material 120 that responds to a change in a sensed parameter by a dimensional change of the sensor material 120. The sensor material 120 is oriented among the loops 111 of the inductor 110 within a region defined by the loops 111 of the inductor 110. When exposed to changes in the parameter of interest, the sensor material 120 undergoes a dimensional change (e.g., expands or contracts) which produces a corresponding dimensional change of the region defined by the loops 111 of the inductor 110.

Figure 1C:
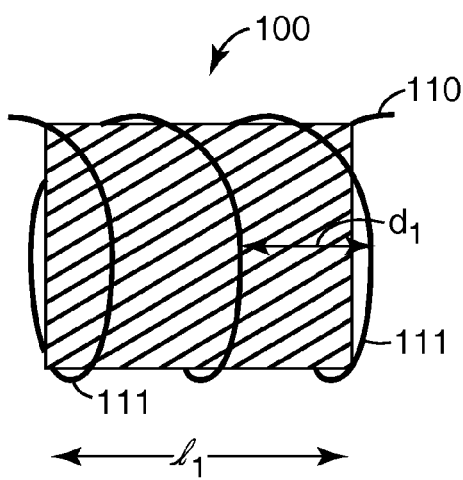
FIGS. 1C and 1D illustrate side and cross sectional views, respectively, of an inductive sensor incorporating a dimensionally responsive sensor material in a final condition after the change in the parameter of interest has occurred in accordance with embodiments of the invention.
Figure 1D:
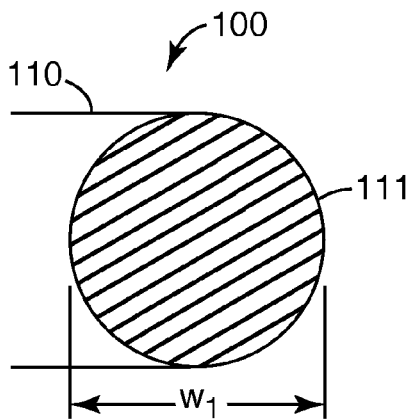

FIGS. 1A and 1B illustrate side and top views, respectively, of the inductive sensor 100 in an initial condition prior to the change in the parameter being sensed. The inductive sensor 100 has an initial configuration including initial length $l_0$, initial diameter $w_0$, initial area $A_0$, and initial distance between each pair of coils $d_0$. FIGS. 1C and 1D illustrate side and cross sectional view of the inductive sensor 100 after exposure to the parameter change. One or more of the length $l_1$, diameter $w_1$, area $A_1$, or distance $d_1$ between the loops 111 have changed due to expansion of the sensor material 120, causing a corresponding expansion in the region defined by the inductor loops 111. A change in any one or more of length, diameter, area or distance between the loops of the inductor causes a change in the inductance value of the inductor.

The sensor material is selected to exhibit a dimensional change due to a change in a sensed parameter of interest. For example, the sensor material may expand or contract along one or more axes causing a change in one or more of the width, length, or cross sectional area of the sensor material. One particularly useful sensor material comprises a hydrogel, such as poly(vinyl alcohol)-poly(acrylic acid) hydrogel, denoted herein as pVA-pAA hydrogel, that undergoes a dimensional change due to changes in environmental conditions such as moisture, pH, or other parameters.

Figure 2A:
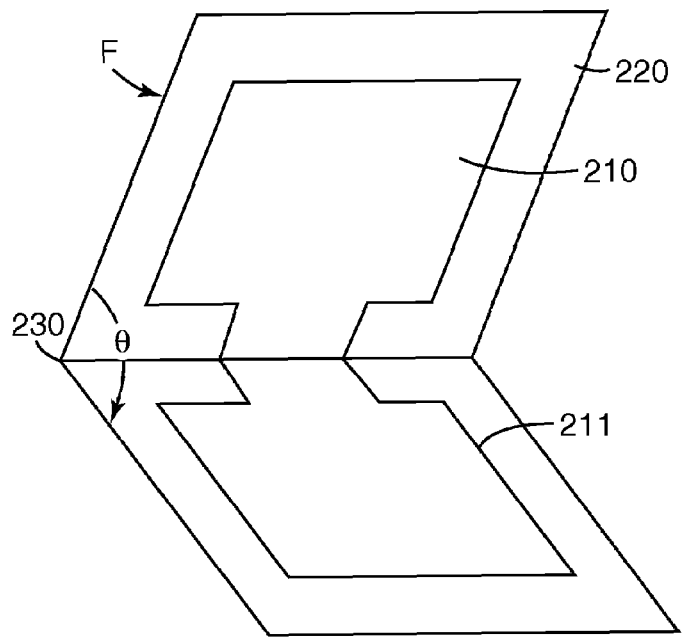
FIG. 2A illustrates a hinged inductive sensor without sensor material in accordance with embodiments of the invention.

FIG. 2A illustrates another embodiment of an inductive sensor. In this embodiment, the sensor material is optional. Loops of an inductor 210, 211, which may be optionally formed on a substrate 220, are coupled by a hinge 230. Operation of the hinge 230 changes the angle, θ, between the loops 210, 211 causing a change in the distance between the loops 210, 211 and a corresponding change in the inductance of the inductor. The hinge 230 may include a spring or other mechanism that opposes a force, F, applied directly or indirectly to one or both of the loops 210, 211.

Figure 2B:
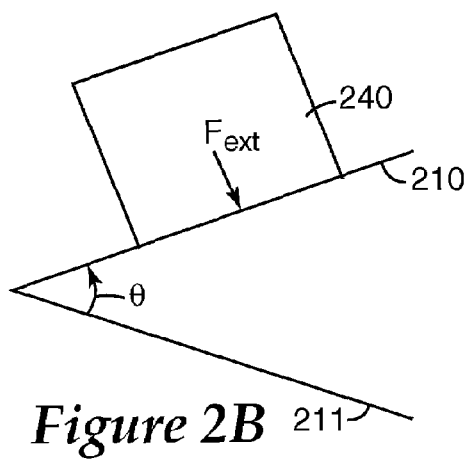
FIGS. 2B and 2C illustrate forces produced by a dimensionally responsive sensor material configured in accordance with embodiments of the invention.
Figure 2C:
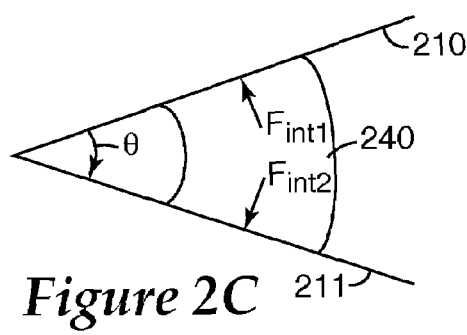

As illustrated in FIG. 2B, some embodiments may utilize sensor material 240 disposed external to the angle θ formed by the loops 210, 211. A dimensional change in the sensor material 240 produces the force, $F_{ext}$, on one or both loops 210, 211. In other embodiments, illustrated in FIG. 2C, the sensor material 240 may be disposed internal to the angle θ formed by the loops 210, 211. A dimensional change in the sensor material 240 produces the forces, $F_{int1}$, $F_{int2}$ on one or both loops 210, 211.

Figure 3A:
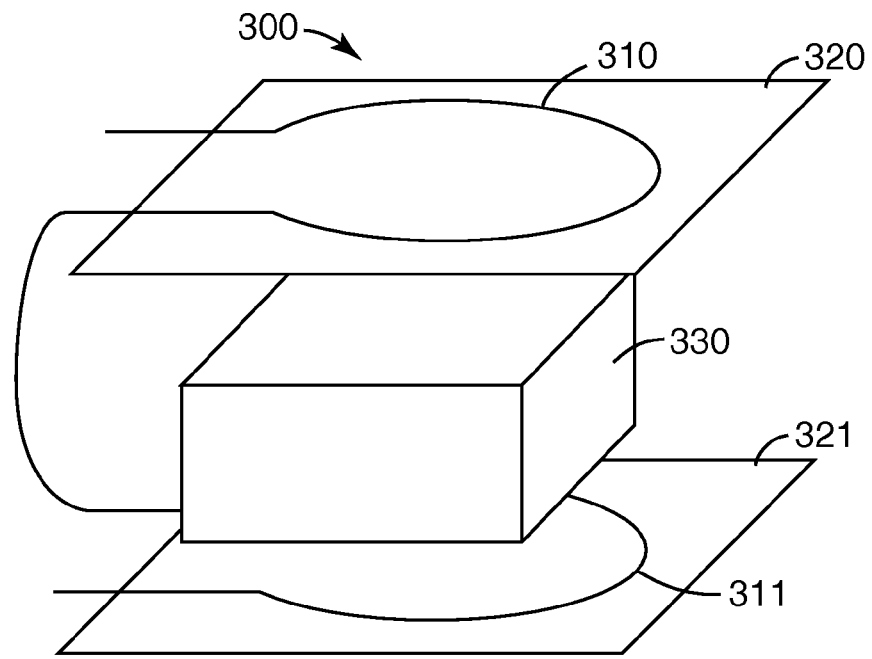
FIG. 3A illustrates a hingeless configuration for an inductive sensor after orientation of the loops and disposition of the sensor material between the substrates in accordance with embodiments of the invention.
Figure 3B:
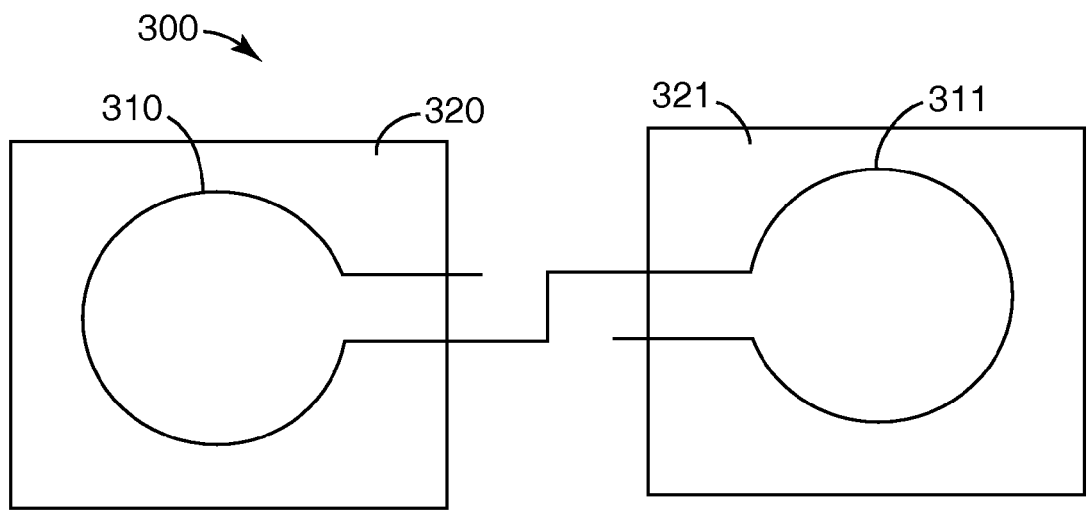
FIG. 3B illustrates a planar view of the substrates and loops of an inductive sensor without the sensor material.

FIGS. 3A-3D illustrate a hingeless configuration for an inductive sensor 300 in accordance with one embodiment. FIG. 3A shows the inductive sensor after orientation of the substrates 320, 321 and loops 310, 311 and disposition of the sensor material 330 between the substrates 320, 321 and loops 310, 311. FIG. 3B illustrates the substrates 320, 321 and electrical connections of the loops 310, 311 without the sensor material.

Figure 3C:
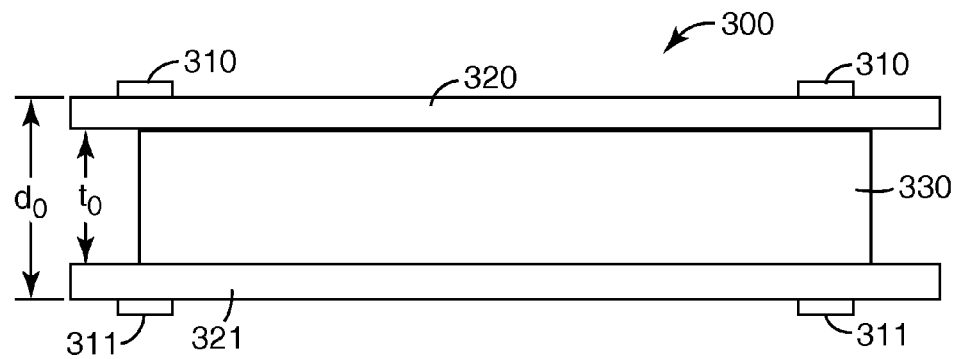
FIGS. 3C and 3D are schematic cross sectional views of an inductive sensor before and after a dimensional change in the sensor material in accordance with embodiments of the invention.
Figure 3D:
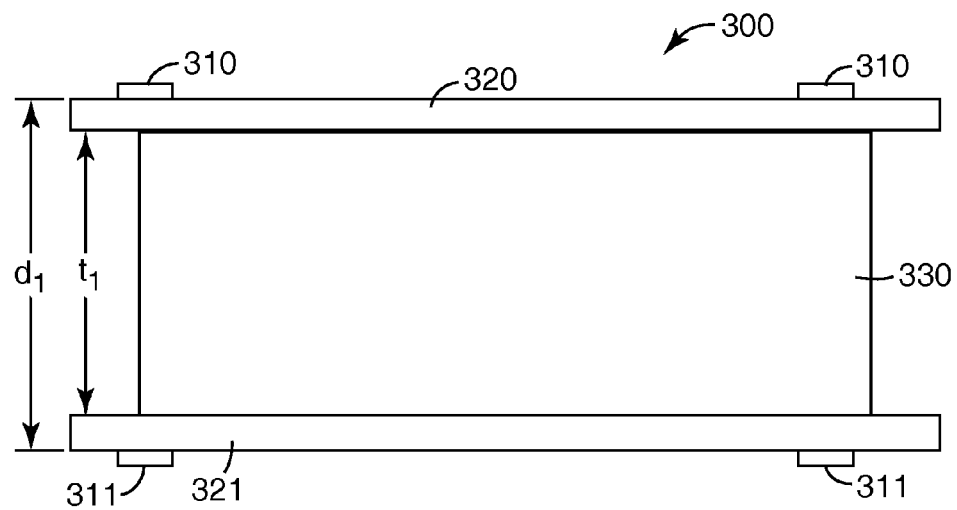

As further illustrated by the cross sectional views of FIGS. 3C and 3D, the inductive sensor 300 includes two loops 310, 311, formed respectively on substrates 320, 321. Sensor material 330 is disposed between the loops 310, 311. The sensor material 330 has an initial thickness of $t_0$ resulting in a distance $d_0$ between the loops 310, 311. The sensor material 330 is dimensionally sensitive to a particular sensed parameter of interest. Following a change in the sensed parameter, the sensor material 330 expands to a thickness $t_1$ producing a distance $d_1$ between loops 310, 311. Alternatively, in some implementations, the sensor material 330 may contract from the initial thickness $t_0$ after exposure to the sensed parameter, bringing the loops 310, 311 closer together.

As illustrated in FIG. 3B, the inductive sensor 300 may be electrically connected as a positive-type device wherein the current in the upper and lower loops 310, 311 flows in the same direction. The magnetic field produced by the loops 310, 311 of a positive type device are additive, causing a positive mutual inductance between the loops 310, 311. The overall inductance of a positive-type device increases as the loops 310, 311 move closer and decreases as the loops 310, 311 move apart.

Alternatively, the inductive sensor may be electrically connected as a negative-type device. The current in the upper and lower loops of a negative-type device flows in opposing directions. In this configuration, a magnetic field produced by the current flowing in one loop diminishes the magnetic field produced by the current flowing in the opposing loop. Cancellation of the magnetic fields produces a negative mutual inductance between the loops. The overall inductance of a negative-type device decreases as the loops move closer and increases as the loops move apart.

The sensors illustrated by FIGS. 1-3 may be used to sense a variety of environmental conditions such as temperature, moisture, pH, fluid flow, salinity, solvent composition, glucose concentration, electric field, light, and ion concentration, for example.

Figure 4A:
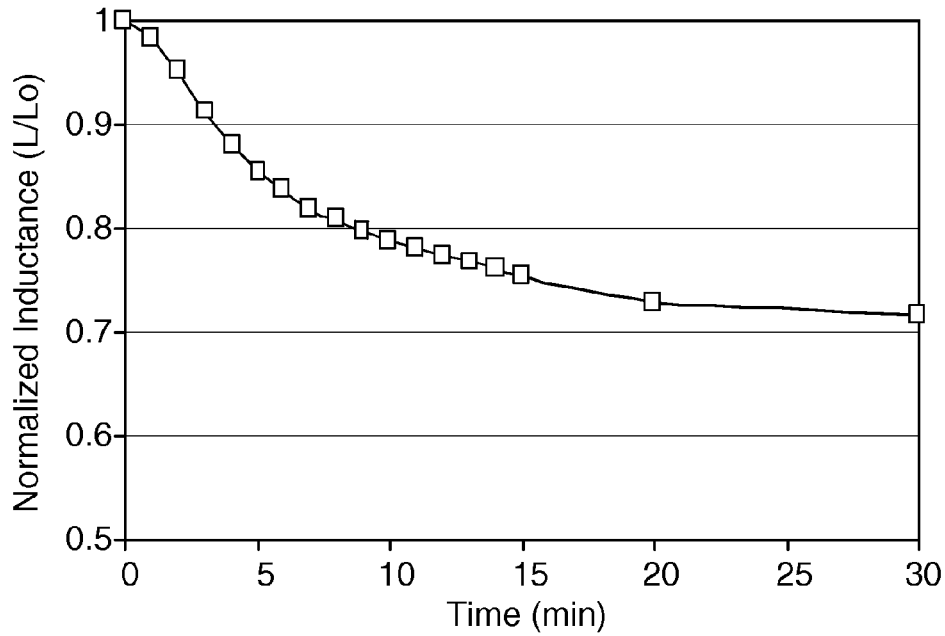
FIG. 4A is a graph illustrating the change in inductance over time after an inductive sensor configured as a moisture sensor is exposed to water.

The graph of FIG. 4A illustrates the change in inductance of a 20 turn copper coil inductor having lead diameter of about 200 μm, a coil length of about 6 mm, a coil diameter of about 6 mm, and an initial inductance, $L_0$, of about 1.8 μH. The inductor was dipped in poly(vinyl alcohol)-poly(acrylic acid) (pVA-pAA) hydrogel to coat the copper wire of the inductor with the hydrogel. Devices having this configuration were used to demonstrate pH and moisture level sensing. After drying, a hydrogel-coated inductor was placed in de-ionized water and the inductance measured over time, as depicted in FIG. 4A.

Figure 4B:
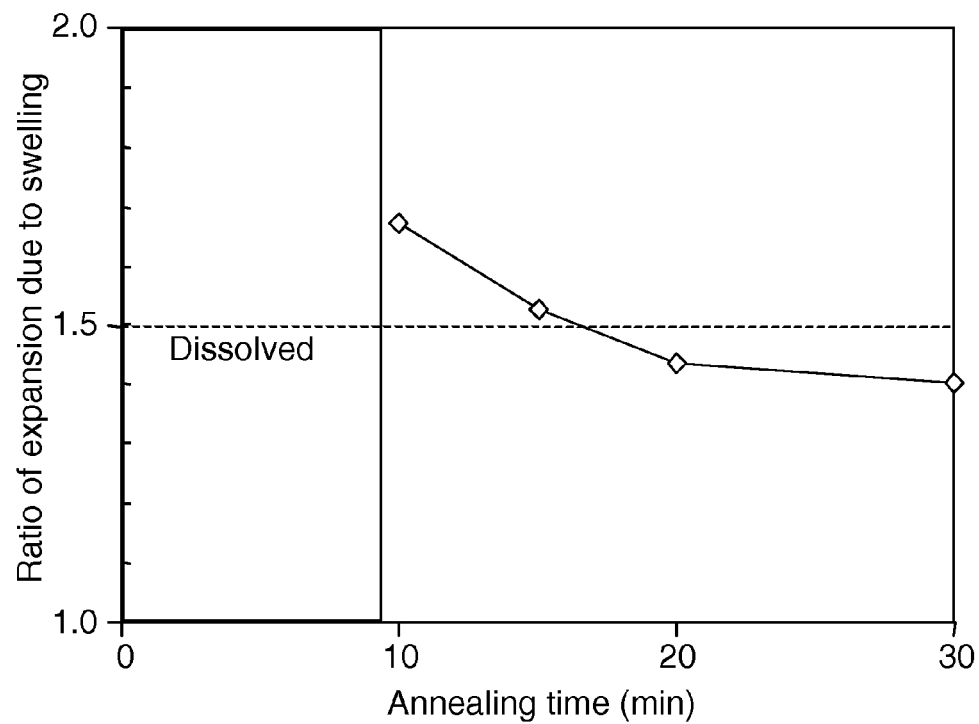
FIG. 4B is a graph illustrating the effect of annealing on certain sensor materials.

Some compositions of pVA-pAA hydrogel are soluble in water without annealing. For example, a hydrogel with 3% wt. pVA and 6% wt. PAA becomes insoluble when it is annealed at 130° C. for 10 min or more as shown in FIG. 4B. FIG. 4B illustrates the dependence between anneal time and ratio of expansion of the hydrogel.

Figure 4C:
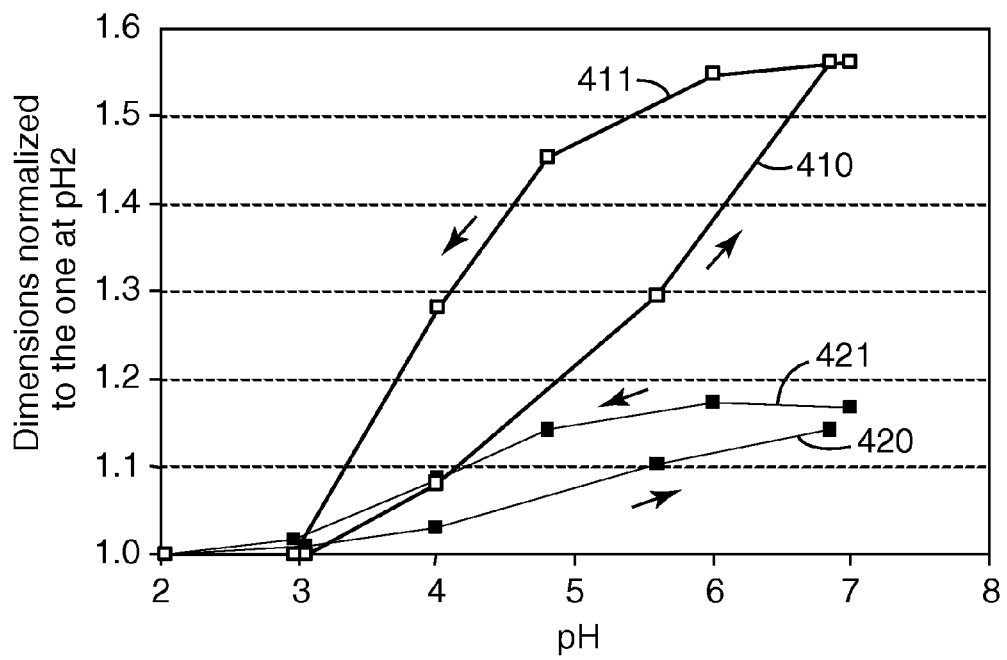
FIG. 4C is a graph showing the expansion/contraction curves for two types of hydrogel as a function of pH.

A hydrogel with 12% wt. pVA and 1.5% wt. pAA was observed to be insoluble in water without annealing. The graph in FIG. 4C illustrates the expansion/contraction curves for two types of hydrogel as a function of pH. Curves 410 and 411 illustrate normalized contraction and expansion curves, respectively, of a hydrogel comprising 3% wt. pVA and 6% wt. PAA annealed at 130° C. for 20 minutes. Curves 420, 421 illustrate normalized contraction and expansion curves, respectively, of a hydrogel comprising 12% wt. pVA and 1.5% wt. pAA. The hysteresis observable in the expansion and contraction curves 410, 411, 420, 421 may be used as a memory allowing the detection of prior expansion or contraction cycles.

In certain embodiments, an inductive sensor may be coupled with a capacitor to form a resonant tank circuit. The resonant frequency and/or other resonance characteristics of the resonant circuit change as a function of the inductance of the inductive sensor. The change in resonant frequency and/or other resonance characteristics may be detected via detector circuitry coupled via a wired or wireless connection to the resonant circuit.

Remote sensing through a wireless connection is particularly useful for difficult to access locations and/or for low-cost applications. Electronic article surveillance (EAS) or radio frequency identification (RFID) technology has been used to detect the presence of and track the movement of articles of interest. For example, EAS and/or RFID technology is frequently used for detecting and tracking books in bookstores or libraries. The inductive sensor as described herein may be used as an element of a resonant circuit joining together sensing functionality with the remote access capability of EAS or RFID technology.

Figure 5A:
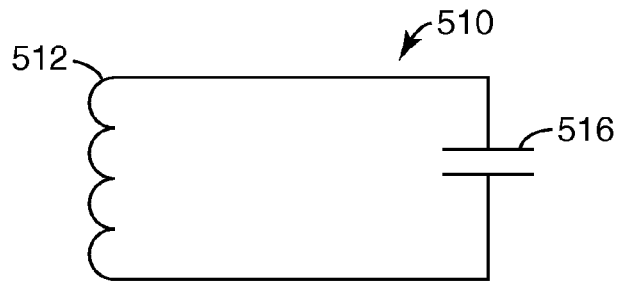
FIG. 5A is a schematic diagram of a resonant circuit used for RFID applications.

FIG. 5A is a schematic diagram illustrating a resonant circuit 510 used for EAS/RFID applications. An EAS/RFID device capable of remote access may use a simple circuit 510 comprising an inductor 512 and a capacitor 516 in parallel. The circuit 510 is designed to resonate at a specific frequency that is dependent on the values of the circuit components 512, 516. The inductor 512 acts as an antenna used to receive, reflect and/or transmit electromagnetic energy, such as radio frequency (RF) energy. In some applications, additional circuitry (not shown) is coupled to the resonant circuit 510 for outputting an identification code via the antenna. Devices that are capable of transmitting a code are typically referred to as RFID devices. Devices without the additional circuitry for outputting the ID code are often referred to as EAS device. An EAS device is designed to absorb and disrupt an electromagnetic (EM) field, such as an RF field, emitted by a reader. The disruption of the EM field may be detected by the reader and interpreted to indicate the presence of an EAS device, although the EAS device is typically not capable of transmitting additional information about the article.

In accordance with embodiments of the invention, an EAS- or RFID-based sensing circuit includes an inductive sensor as described herein as a component of a resonant circuit. The inductive sensor is sensitive to one or more parameters of interest. A change in the parameter of interest causes a modification of the inductance value of the inductive sensor. A change in the inductance of the resonant circuit causes a corresponding change in a resonance characteristic of the resonant circuit. In various configurations, the resonance characteristic that is modified by the change in inductance may include the resonant frequency, Q factor, bandwidth, and/or other resonance characteristics of the resonant circuit.

Figure 5B:
FIG. 5B is a schematic diagram of a resonant circuit incorporating an inductive sensor in accordance with embodiments of the invention.

The schematic of FIG. 5B illustrates a resonant circuit/sensor 520 that includes an inductive sensor 522 and capacitor 516. The inductive sensor 522 is configured to change inductance value based on a parameter of interest. Variations in the inductance value of the inductive sensor 522 cause changes in a resonance characteristic of the resonant circuit/sensor 520. The change in the resonance characteristic can be remotely detected and interpreted by an RFID or EAS reader (not shown).

Changes in the resonant frequency, or other resonance characteristic, can be interpreted to indicate that a change in the sensed parameter of interest has occurred. According to some implementations, changes in the resonant frequency of the circuit 520 are interpreted to determine an amount, degree, or duration of change in the sensed parameter. Detecting changes in the resonant frequency (or other characteristic) of the circuit 520 over a period of time may be used to track the progression of change of the sensed parameter over a time period.

Figure 6A:
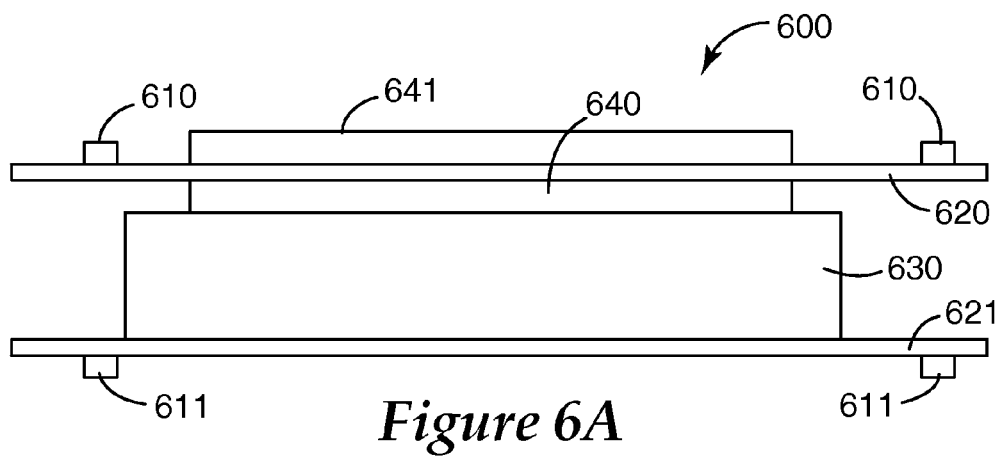
FIG. 6A illustrates a schematic cross sectional view of a resonant circuit/sensor in accordance with embodiments of the invention.
Figure 6B:
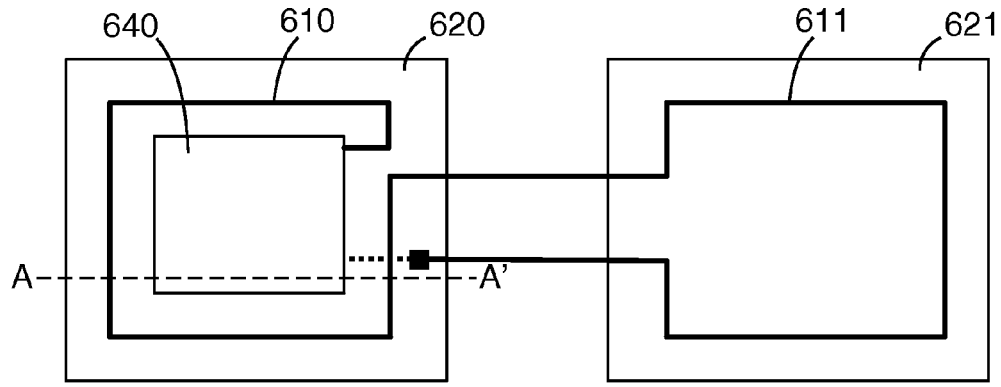
FIG. 6B shows the resonant circuit components and substrates of the resonant circuit/sensor of FIG. 6A in a planar view without the sensor material.

FIGS. 6A-6E illustrate various embodiments of an inductive sensor having two coil loops and forming a resonant circuit with a capacitor. FIG. 6A illustrates a cross sectional view of a resonant circuit/sensor 600 taken at cross section A-A' of FIG. 6B in accordance with one embodiment. The inductive sensor includes two loops 610, 611 disposed on substrates 620, 621. First and second plates 640, 641 forming a capacitor are disposed on opposite sides of one of the substrates 620. A sensor material 630 that is dimensionally sensitive to a parameter of interest is disposed between the substrates 620, 621, or loops 610, 611 so that a dimensional change in the sensor material 630 causes a corresponding change in the distance between the loops 610, 611. FIG. 6B illustrates the resonant circuit components 610, 611, 640 and substrates 620, 621 without the sensor material. The inductor and capacitor are electrically connected to form a resonant circuit, such as the circuit 520 illustrated in FIG. 5B.

Figure 6C:
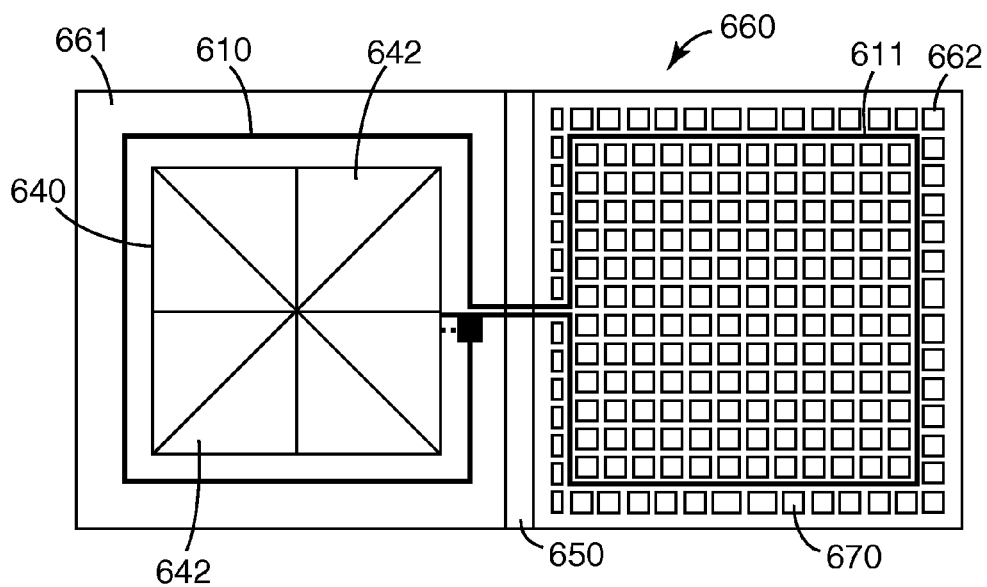
FIG. 6C depicts a resonant circuit/sensor including a segmented capacitor electrode and perforations in the substrate in accordance with embodiments of the invention.
Figure 6D:
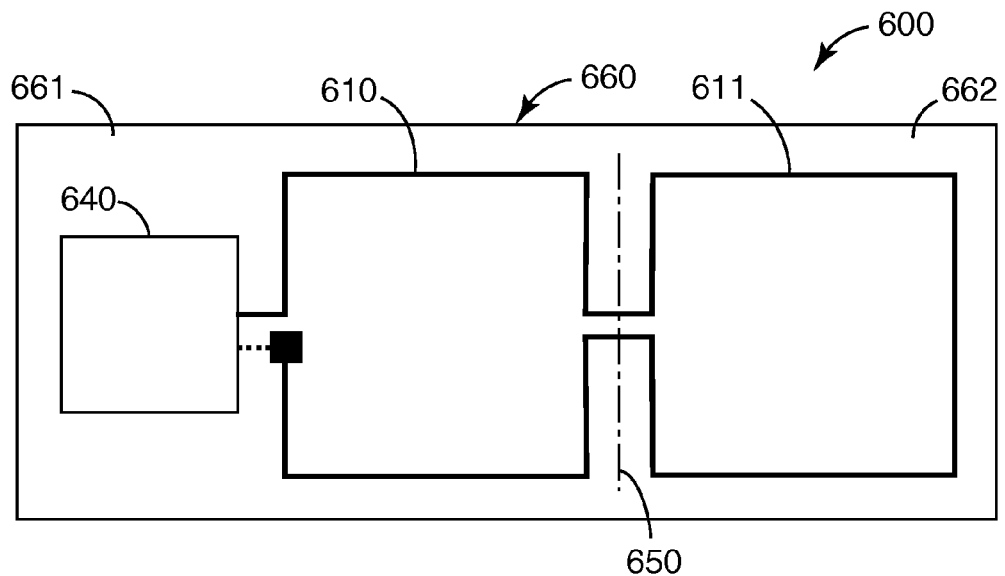
FIGS. 6D and 6E illustrate inductive sensors electrically connected as negative- and positive-type devices, respectively, in accordance with embodiments of the invention.
Figure 6E:
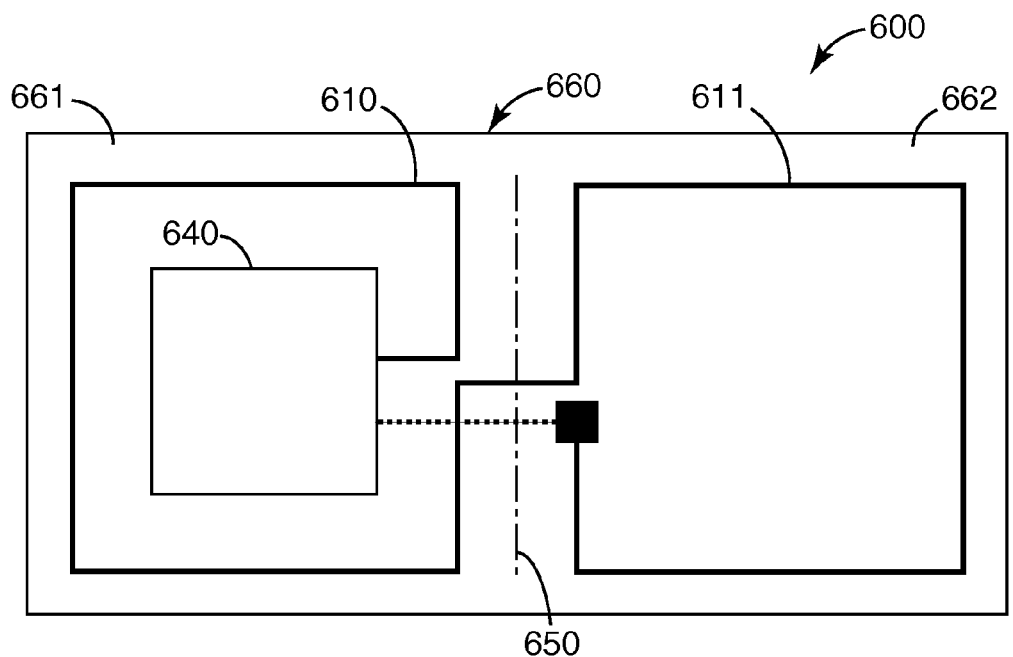

In some embodiments, as illustrated by FIGS. 6C-E, the loops 610, 611 of the inductor and the capacitor plates 640 may be formed on a single, foldable substrate 660 that includes first and second portions 661, 662. The first and second portions 661, 662 of the substrate 660 are separated by a flexural hinge portion 650. Operation of the flexural hinge 650 allows for orienting the inductor loops 610, 611 so that they overlap each other. A dimensionally responsive sensor material (not shown) may be oriented with respect to loops 610, 611 so that a dimensional change in the sensor material causes the loops to move closer together or farther apart. Some embodiments employ perforations 670 to allow an analyte to reach the sensing material which is sandwiched between the substrate portions 661, 662.

One or both electrodes 640 of the integral capacitor may be divided into sections 642 as illustrated in FIG. 6C. Dividing the capacitor electrodes 640 into sections 642 reduces eddy currents in the capacitor electrodes 640 that may interfere with the magnetic coupling between the device 600 and an external antenna of the interrogator.

FIGS. 6D and 6E illustrate various configurations for inductive sensors and capacitors arranged as resonant circuits formed on a foldable substrate 660. FIG. 6D illustrates a negative-type device having capacitor plates 640 formed on one substrate portion 661 outside the region enclosed by loop 610. When the substrate 660 is folded at the flexural hinge 650, and the loops 610, 611 overlap, currents in the upper 610 and lower 611 loops flow in opposing directions, producing negative mutual inductance due to cancellation of the magnetic fields produced by current flowing in the loops 610, 611. The overall inductance of this negative-type device decreases as the upper and lower loops 610, 611 move closer to one another and increases as the loops 610, 611 move farther apart.

FIG. 6E illustrates a positive-type device. When the substrate 660 is folded so that the substrate portions 661, 662 and the loops 610, 611 overlap, currents in the overlapping loops 610, 611 flow in the same direction. The overall inductance of the positive-type device increases as the loops 610, 611 move closer together and decreases as the loops 610, 611 move farther apart.

Figure 7A:
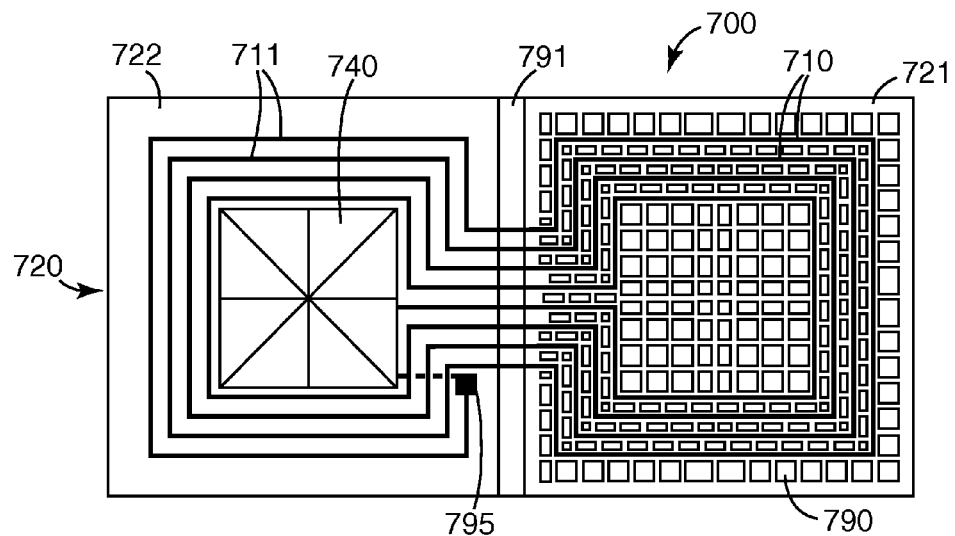
FIG. 7A illustrates a resonant circuit/sensor having an inductor with multiple concentric loops disposed on a single foldable substrate in accordance with embodiments of the invention.
Figure 7B:
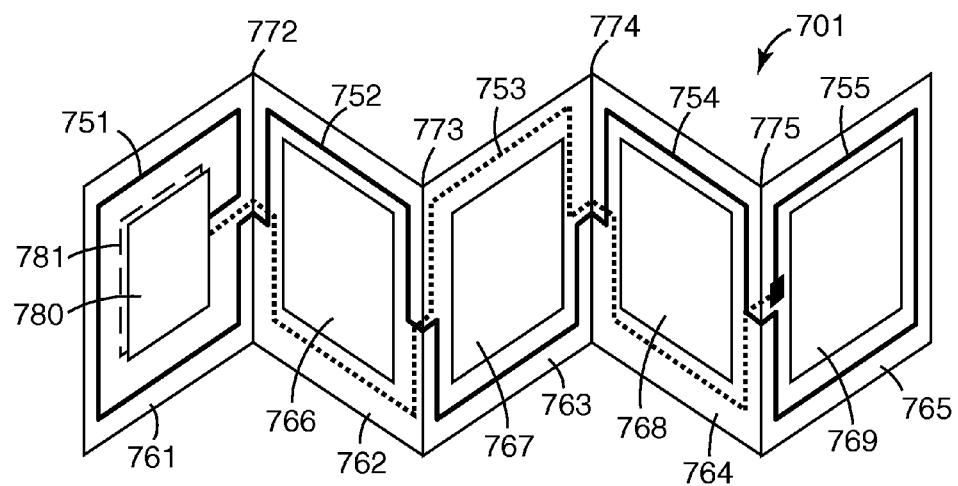
FIG. 7B shows a resonant circuit/sensor that includes an inductor having multiple loops formed on five flexible, foldable substrate portions in accordance with embodiments of the invention.

In some embodiments, the inductor of the inductive sensor may include multiple loops, such as those illustrated in FIGS. 7A and 7B. The use of additional loops provides for an increased nominal inductance, which is beneficial to achieving better inductive coupling between the sensor and the interrogator. FIG. 7A illustrates a resonant circuit/sensor having an inductor with multiple concentric loops 710, 711 disposed on a single foldable substrate 720. Multiple concentric loops 710, 711 are formed on substrate portions 721, 722, respectively. The substrate 720 includes a flexural hinge portion 791 between the substrate portions 721, 722. When folded, the loops 710, 711 overlap to form a multiple loop inductor. A capacitor is formed on one substrate portion 722 with segmented capacitive plates 740 disposed within the region enclosed by an inductor loop 711. One or both portions of the substrate 721, 722 may include perforations 790 to allow exposure of the sensor material (not shown) disposed between the loops 710, 711 to an analyte or other ambient condition being sensed. Appropriate electrical connections to achieve negative or positive-type inductors and/or formation of a resonant circuit may be made using via interconnects 795.

In another embodiment, illustrated in FIG. 7B, a resonant circuit/sensor 701 includes an inductor having multiple loops 751-755 formed on five flexible substrate portions 761-765. Each substrate portion 761-765 contributes one loop 751-755 to the inductor of the device 701. The loops 751-755 may be formed either all on one side of a substrate portion 761-765 or half on each side of a substrate portion 761-765 as shown. The substrate portions 761-765 are stacked by folding the device 701 in a zigzag manner at flexural hinges 772-775, resulting in a solenoid-like inductor coupled with a capacitor having plates 780, 781 formed on one of the substrate portions 761. The substrate portions that do not include the capacitive plates 780, 781 may optionally have through holes 766-769.

In some embodiments, sensor material (not shown) is disposed between on or more of the substrate portions 761-765. If the substrates portions 761-765 include through holes 766-769, the sensor material is disposed along the periphery of the substrate portions 761-765.

Figure 8:
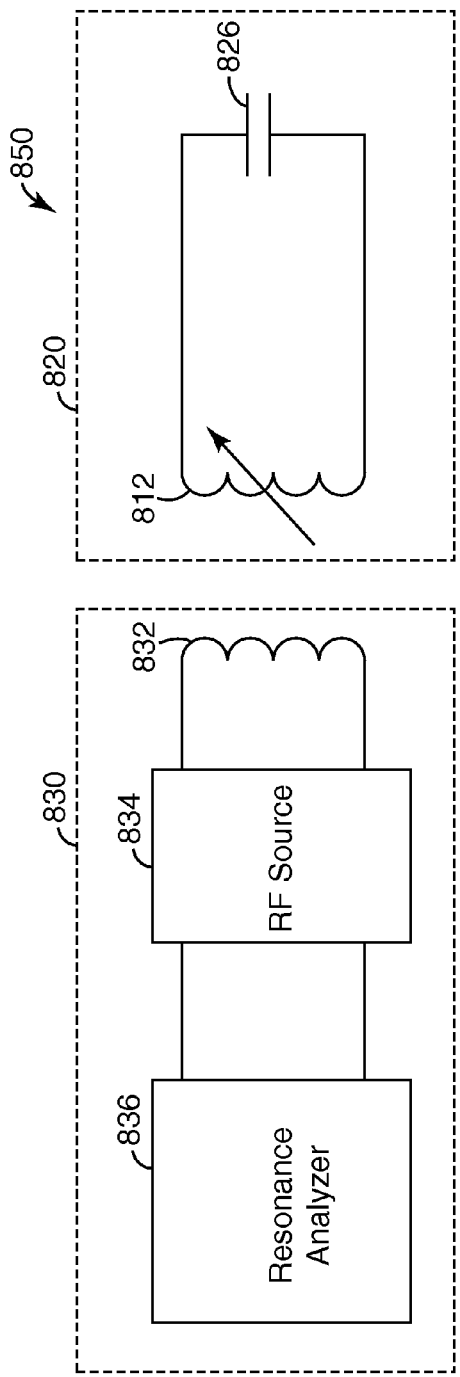
FIG. 8 is a block diagram of a remote sensing system in accordance with embodiments of the invention.

Remote sensing via the inductive sensors described above may be accomplished using interrogator circuitry capable of wirelessly accessing the resonant circuits incorporating the inductive sensors. The block diagram of FIG. 8 illustrates a remote sensing system 850 including an interrogator 830, also denoted herein as reader, and a resonant circuit 820 having a capacitor 826 coupled to an inductive sensor 812. The interrogator 830 includes a radio frequency (RF) source 834 and resonance analyzer 836.

The interrogator 830 includes an antenna 832 to transmit an RF signal to the resonant circuit 820. The resonant circuit 820 absorbs and reflects RF energy near the resonant frequency of the circuit 820. The interrogator 830 may be configured to detect changes in the transmitted signal caused by the absorption and/or reflection of RF energy by the resonant circuit 820. Changes in the interrogator signal which are attributable to absorption/reflection of energy by the resonant circuit 820 and/or detection of a signal reflected by the resonant circuit 820 are denoted herein as the resonant circuit signal.

The inductive sensor 812 is designed to respond to a certain parameter of interest by altering the inductance value of the sensor 812. A change in the inductance value of the resonant circuit 820 shifts the resonant frequency of the circuit 820. This frequency shift is detectable by the resonance analyzer 836 of the interrogator 830.

Figure 9:
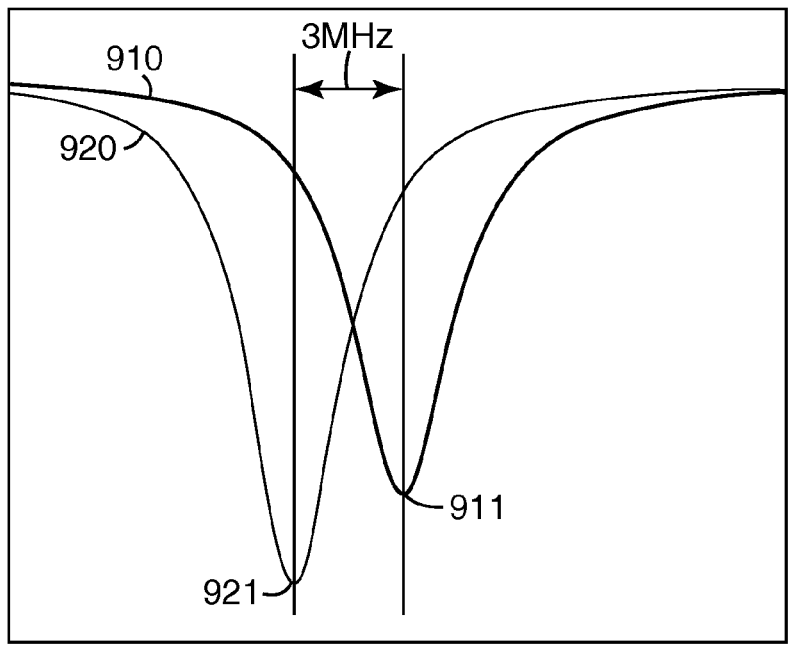
FIG. 9 is a graph showing signals produced an interrogator from frequency sweeps obtained at times $t_1$ and $t_2$, respectively, and indicating a downward shift in the resonant frequency of the resonant circuit.
Figure 10:
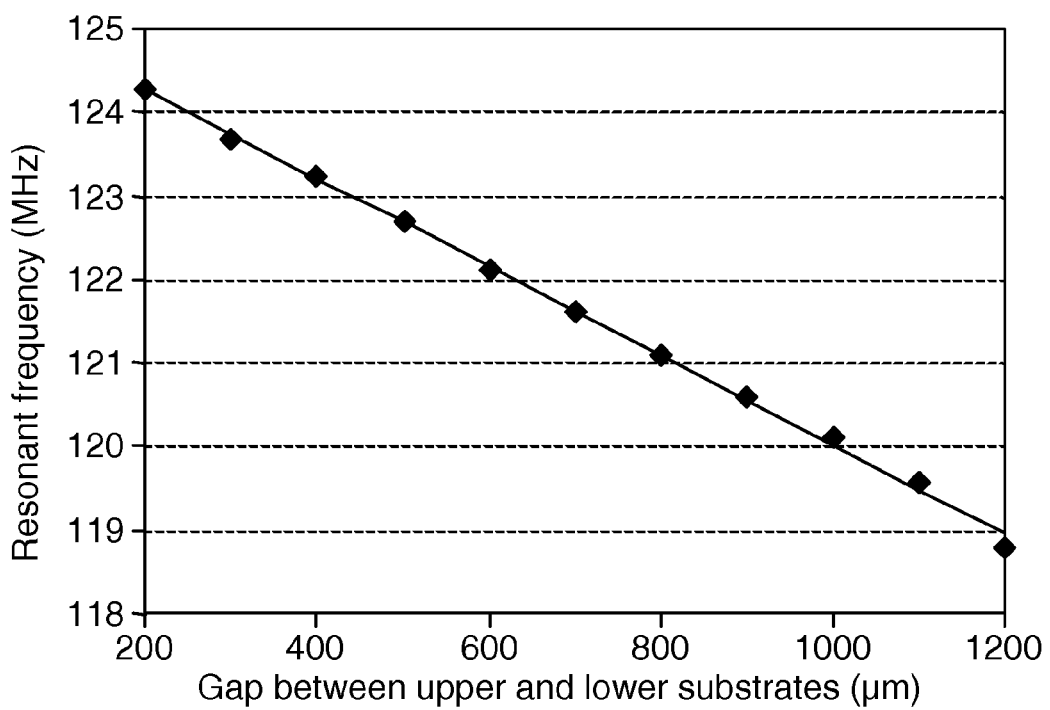
FIG. 10 shows a graph of resonant frequency as a function of distance between the inductor loops.

FIG. 9 shows signals 910, 920 produced an interrogator from frequency sweeps obtained at times $t_1$ and $t_2$, respectively. The signals 910, 920 are produced by the interrogator when resonant circuit/sensor is present in the vicinity of the interrogator. Signal 910 includes feature 911 associated with the initial resonant frequency of the resonant circuit at time $t_1$. Signal 920 exhibits a signal feature 921 associated with the resonant frequency of the resonant circuit/sensor at time $t_2$ after an increase of about 200 µm between the loops of the inductive sensor. Comparison of the signal features 911, 921 indicates a downward shift in the resonant frequency of the resonant circuit of about 3 MHz. FIG. 10 shows a graph of resonant frequency as a function of distance between the inductor loops.

Figure 11A:
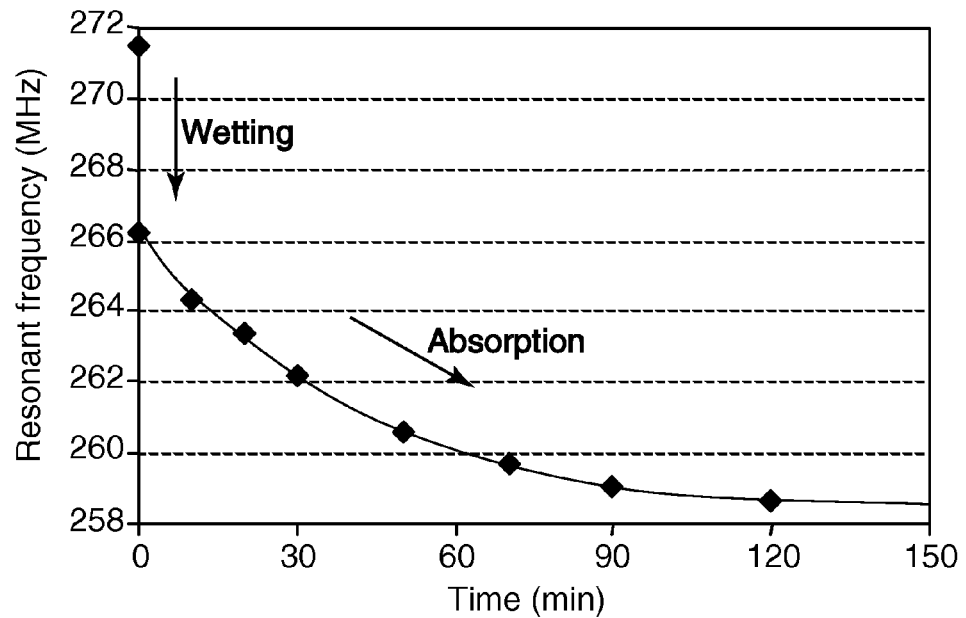
FIG. 11A shows a graph of the resonant frequency as a function of time after wetting a resonant circuit/sensor configured as a moisture sensor in accordance with embodiments of the invention.
Figure 11B:
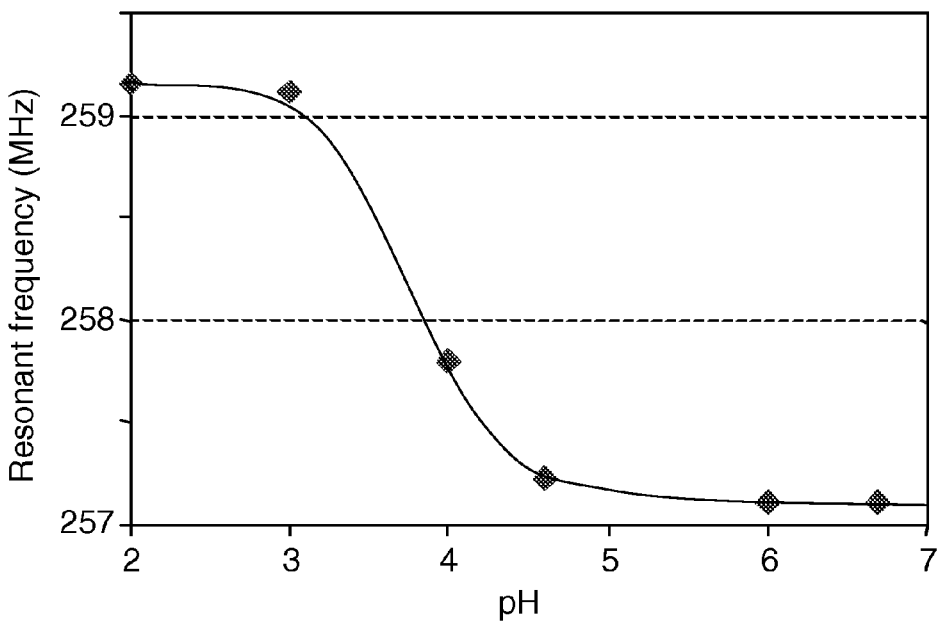
FIG. 11B depicts a graph illustrating the frequency change with respect to pH for a resonant circuit comprising an inductive sensor using one particular formulation of a hydrogel sensor material in accordance with embodiments of the invention.

A sensor that uses hydrogel as the sensor material, such as the pVA-pAA hydrogel previously described, allows for wireless monitoring of moisture absorption and/or pH. FIG. 11A shows a graph of the resonant frequency as a function of time after wetting the device. As moisture is absorbed by the sensor material, the resonant frequency of the sensor shifts downward. The result shown in FIG. 11A indicates an eventual saturation of the absorption. The graph of FIG. 11B illustrates the frequency change of the resonant circuit with varying pH for one particular formulation of a hydrogel sensor material used in the inductive sensor.

In some implementations, multiple inductive sensors may be monitored simultaneously. For example, the inductive sensors may be incorporated in resonant circuits which have different resonant frequencies to facilitate wireless monitoring of the sensors. The multiple sensors may be configured to respond to different sensed parameters or to the same sensed parameter. In some embodiments, inductive sensors may be spatially distributed over an area of interest. The sensors can be monitored to acquire information about changes in one or more sensed parameters over the area of interest. The use of wirelessly accessible spatially distributed sensors, aspects of which may be used in conjunction with the inductive sensors disclosed herein, is described in commonly owned U.S. patent application Ser. No. 11/383,652 filed May 16, 2006 and incorporated herein by reference.

In some implementations, the signal produced by a resonant circuit incorporating an inductive sensor as described herein may be altered by various conditions affecting the inductive coupling between the sensing circuit and the interrogator and/or electrical characteristics of the circuit. For example, the sensor signal may be affected by factors other than the sensed parameter of interest, such as the orientation and/or distance of the sensor circuit from the interrogator, electromagnetic interference, nearby metallic material, material interposed between the sensor circuit and the interrogator, changes in temperature, wetting or nearby water, and/or other factors.

A reference signal may be used to account for measurement to measurement variation in the sensor circuit signal due to the above interference sources. In one embodiment, the signal produced by the sensing circuit may be normalized for orientation and/or distance based on the reference signal. If the interference exceeds requirements for a quality measurement, an alarm state may be initiated.

Figure 12:
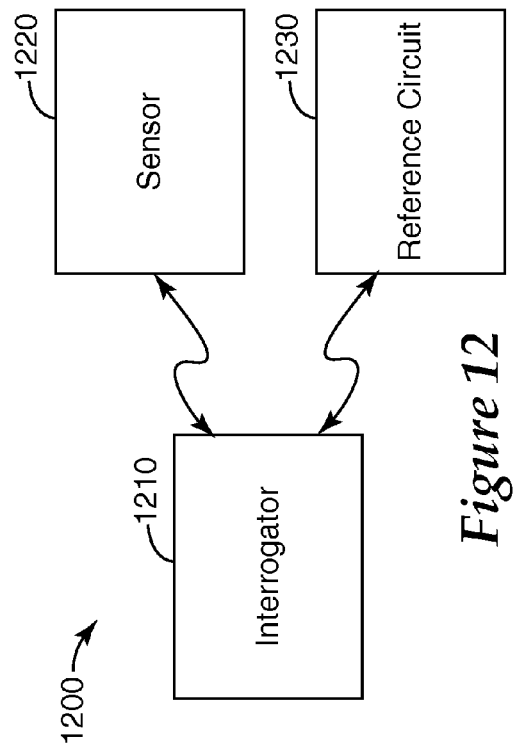
FIG. 12 is a block diagram of a remote sensing system incorporating a reference circuit and a sensor circuit in accordance with embodiments of the invention.

FIG. 12 illustrates a remote sensing system 1200. The sensing system 1200 includes a sensing circuit 1220 and a reference circuit 1230 which are wirelessly coupled to an interrogator 1210. Shifts in the resonant frequency of the sensing circuit 1220 may be interpreted by the interrogator 1210 using the signal produced by the reference circuit 1230.

Figure 13A:
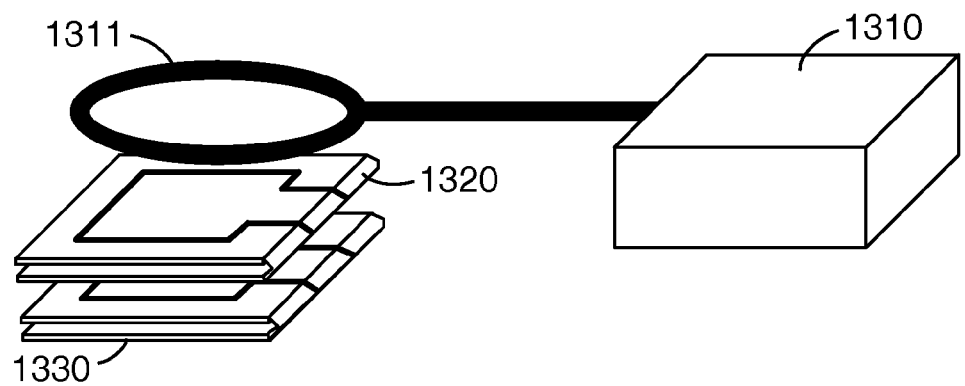
FIG. 13A is a diagram of a sensing system that includes a resonant reference circuit and a resonant sensor circuit in accordance with embodiments of the invention.

Turning now to FIG. 13A, the reference circuit 1330 and the sensor circuit 1320 may comprise resonant circuits to provide for wireless access in accordance with some embodiments. The reference circuit 1330 has a resonant frequency distinct from the resonant frequency of the sensor circuit 1320. In this configuration, both the reference circuit signal and the sensor circuit signal can be remotely detected by the interrogator 1310 via the interrogator antenna 1311. The reference circuit 1330 may employ an inductor that is similar to that of the inductive sensor device 1320, but having a fixed gap between the inductor loops or leaving the device unfolded. The signal produced by the reference circuit 1330 may be used to correct for errors in the sensor circuit signal, including errors produced by the interference sources described above.

Figure 13B:
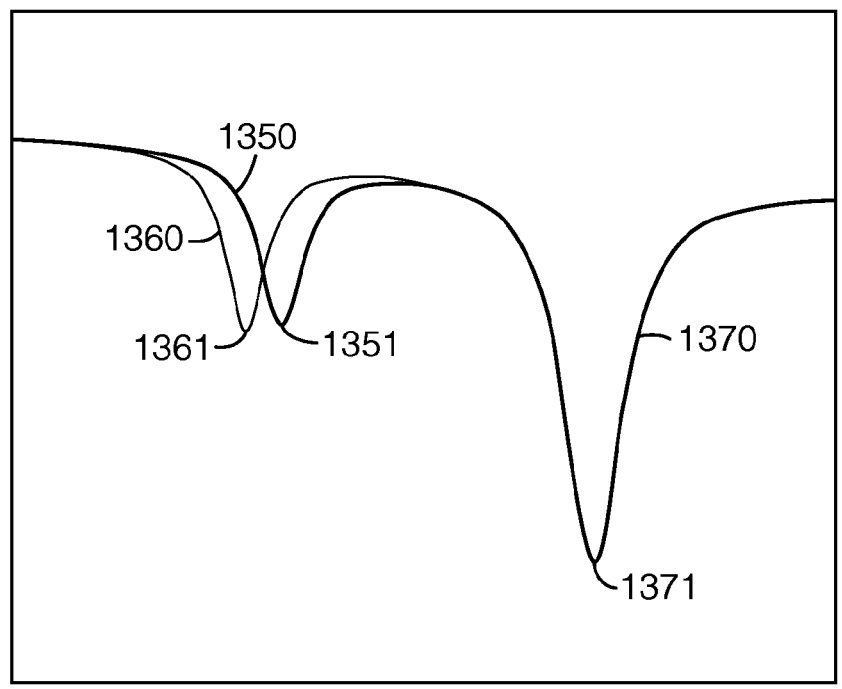
FIG. 13B is a graph showing signals produced an interrogator from frequency sweeps obtained at times $t_1$ and $t_2$, respectively, and indicating stable resonant frequency for the reference circuit and a shift in the resonant frequency of a sensor circuit in accordance with embodiments of the invention.

FIG. 13B shows the resonant circuit signals of the sensor and reference circuits 1320, 1330 detected by the interrogator 1310. FIG. 13B depicts signals 1350, 1360 produced by the sensing circuit 1320 and reference circuit 1330 responsive to frequency scans by the interrogator 1310 at times $t_1$ and $t_2$, respectively. The signal 1350 at time $t_1$ includes a signal feature 1351 produced by the sensor circuit 1320 and associated with the initial resonant frequency of the sensor circuit 1320. The signal 1360 at time $t_2$ includes a signal feature 1361 produced by the sensor circuit 1320 and associated with the resonant frequency of the sensor circuit 1320 after a change in the sensed parameter of interest. Comparison of the signals 1350, 1360 shows a shift in the frequency of the signal features 1351, 1361 produced by the sensing circuit 1320 due to the sensed condition. The signals 1350 and 1360 also exhibit signal features 1370, 1371 produced by the reference circuit 1330 at times $t_1$ and $t_2$, respectively. These signal features 1370, 1371 are associated with the resonant frequency of the reference circuit 1330 which remains substantially unchanged. It will be understood that although this example depicts a downward shift in resonant frequency caused by exposure to the sensed condition, in other configurations, exposure to the sensed condition may cause an upward shift in resonant frequency.

In the graphs illustrated in FIG. 13B, the reference circuit resonant frequency remains the same at times $t_1$ and $t_2$ indicating that the sensor circuit signal is likely not affected by interference. A change in the resonant frequency of the reference circuit over time indicates that the sensor signal may need to be compensated.

Additional details regarding the use of a reference signal for remote sensing is described in commonly owned U.S. patent application Ser. No. 11/383,640 filed May 16, 2006 which is incorporated herein by reference.

Figure 14A:
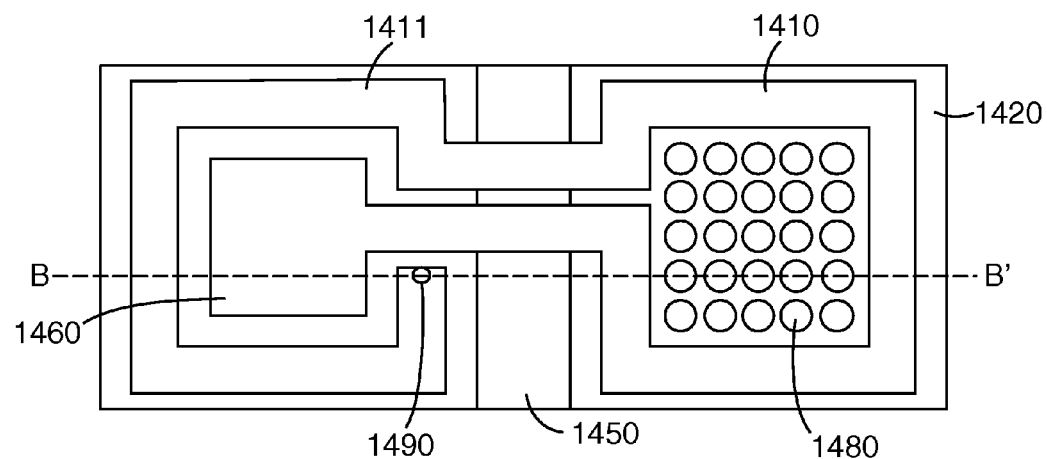
FIGS. 14A-14C illustrate a process for making an inductive sensor in accordance with embodiments of the invention.
Figure 14B:
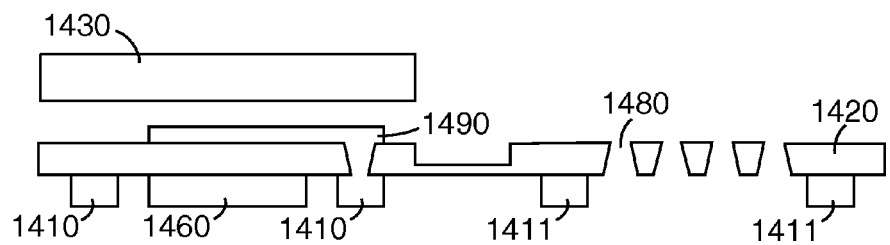
Figure 14C:
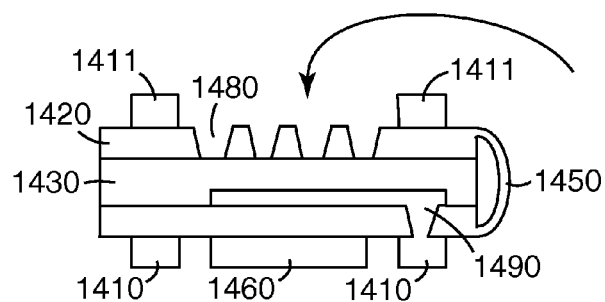

A process for making a resonant sensor circuit in accordance with one embodiment is depicted in FIGS. 14A-C. FIG. 14A illustrates an unfolded, plan view of the sensor. FIG. 14B illustrates the sectional view of the sensor taken through cross section B-B'. As illustrated in the plan and cross sectional views of FIGS. 14A and 14B, respectively, appropriate patterns for a double loop inductor with an integrated capacitor are formed on a planar flexible substrate 1420 such as a polyimide-copper (PI-Cu) foil. The inductor loops 1410, 1411 are formed so that one end of a first loop 1410 is connected to another end of a second loop 1411. A hinge is formed by a thinned portion 1450 of the PI-Cu substrate 1420 between the loops 1410, 1411. A sensor material 1430, such as hydrogel is oriented with respect to the first and second loops. Perforations 1480 may optionally be formed through the PI-Cu substrate 1420 to allow exposure of the sensor material 1430 to an analyte or ambient condition of interest. One or more via connections 1490 are used to facilitate electrical connections through the substrate 1420. The double loop construction of the inductive sensor is achieved by folding the planar substrate 1420 at the thinned hinge 1450 as illustrated by the arrow in FIG. 14C. A dimensional change of the sensor material 1430 varies the interstitial distance between the loops 1410, 1411 and the inductance of the circuit. The configuration illustrated in FIGS. 14A-C offers a device structure that allows fabrication of the inductive sensor using standard lithography-based processes.

FIGS. 15A-H illustrate in more detail an exemplary process for fabrication of inductive sensors and resonant circuits in accordance with embodiments of the invention. Using the process shown in FIGS. 15A-H, the inductive sensors and resonant circuits may be batch-fabricated using polyimide-copper films and photolithography-based techniques, although techniques other than photolithography and/or alternate materials may alternatively be used. FIGS. 15A-H illustrate a fabrication process for one sensor device. Using the techniques described below, multiple devices may be fabricated on a unitary substrate which is later cut to separate the devices.

Figure 15A:
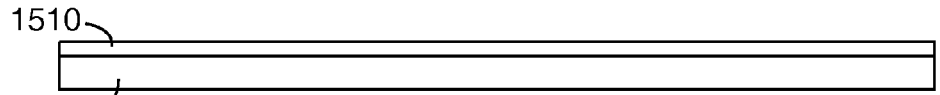
FIGS. 15A-15H illustrate a process for making an inductive sensor using photolithographic techniques in accordance with embodiments of the invention.
Figure 15B:
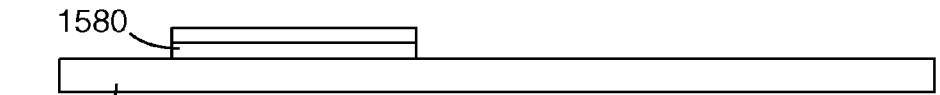
Figure 15C:
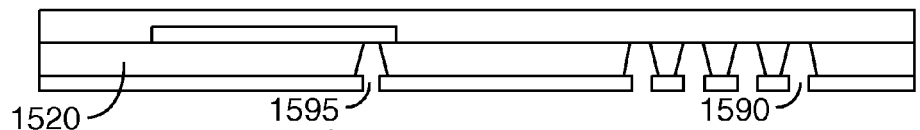
Figure 15D:
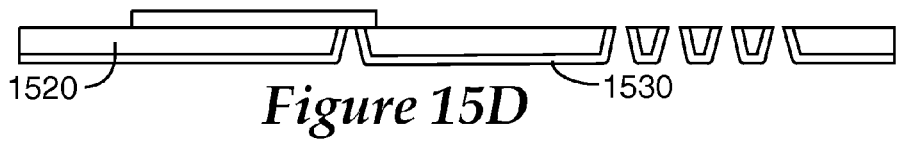
Figure 15E:
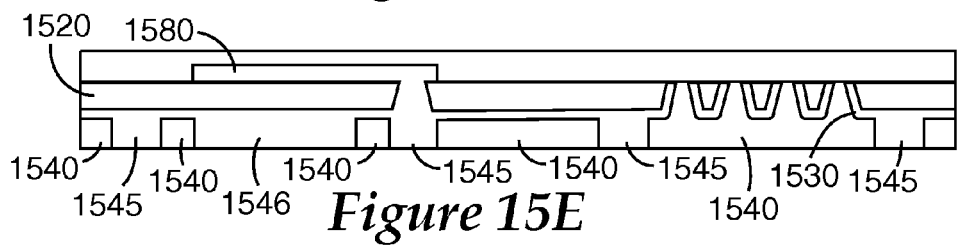
Figure 15F:
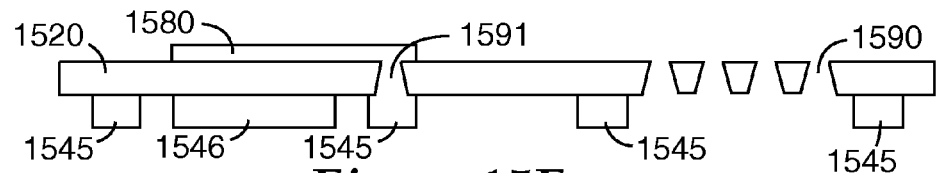

A 15-µm-thick Cu film 1510 coated on a 50-µm-thick PI foil 1520 is patterned using a first mask to form an electrode 1580 of a parallel-plate capacitor (FIGS. 15A and 15B). Through-holes 1590 that serve as paths for fluidic analytes as well as holes 1595 for via contacts for the circuit are fabricated in the polyimide (PI) substrate 1520 (FIG. 15C). Formation of the through holes 1590 and/or via contact holes 1595 may be achieved, for example, by wet etching in an aqueous solution with 40% wt. KOH and 20% wt. ethanolamine. The use of ethanolamine offers reduced tapering in the etched holes, which facilitates the ability to obtain a large opening area where the sensing element is more readily exposed to the analyte. As illustrated in FIG. 15D, a seed layer 1530 is coated on the PI substrate 1520 for use in the electroplating process described in FIG. 15E. The seed layer 1530 is formed by depositing a titanium film of about 100 nm as an adhesion layer and then depositing a Cu film of about 1 µm. A polymethylmethacrylate (PMMA) photo resist film 1540 laminated on the copper surface of the seed layer 1530 is patterned to form a molding die for Cu plating of the inductor loops 1545, second capacitor electrodes 1546, and via interconnects 1591 (FIG. 15E). Thicker loops provide larger inductance and smaller resistance, i.e., a higher quality factor. A photo resist having a thickness of about 50 µm is used to achieve a target height of 40 µm from the Cu plating. The Cu plating is performed in a sulfuric acid based bath with leveling and brightening additives. The Ti/Cu seed layer 1530 is etched after plating to electrically separate the plated structures 1545, 1546, 1591 (FIG. 15F).

Figure 15G:
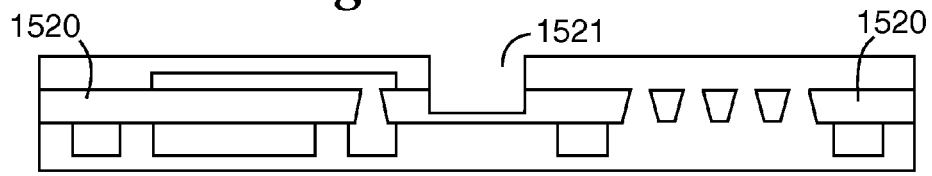
Figure 15H:
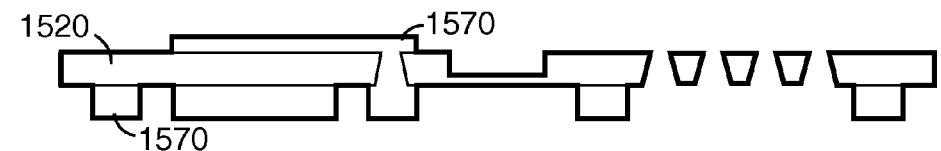

The PI 1520 is again etched to make a thinned portion 1521 forming the flexural hinges (FIG. 15G). Etching for 2 min in a KOH based etcher leaves 10-µm thickness in PI 1520 at the thinned portion 1521. Finally, a conformal dielectric film 1570 of about 1-µm-thick Parylene-C™ is coated over entire surfaces of the devices for electrical protection (FIG. 15H).

As previously discussed, the process detailed above may be used to simultaneously form a solid film that includes a number of planar devices used to form inductive sensors. Individual devices may be cut from the solid film using a blade or other separation techniques, for example.

The individual devices are folded to orient the inductor loops so that they overlap. A dimensionally sensitive sensor material is optionally disposed within opposing substrate portions and/or loops either before or after folding. By selecting appropriate sensor materials, it is possible to perform sensing for a variety of parameters using the device. For example, hydrogels such as pVA-pAA, poly(AA-isooctylacrylate (IOA)), and poly(hydroxyethylmethacrylate (HEMA)-AA) swell/shrink depending on pH of their ambience. Poly(3-sulfopropyl methacrylate (SPMA)-IOA) and some of pAA-based hydrogels are responsive to salt concentration. Poly(N-isopropylacrylamide) (pNIPPAm) is an example of a polymer that responds to temperature. Dimensional changes of phenylboronic-acid based hydrogels can be correlated to glucose concentration.

Sensing of multiple chemical/physical/biological parameters can be implemented by using multiple sensor devices incorporating different sensor materials. For example, simultaneous monitoring of pH and salinity can be performed by using pVA-pAA and poly(SPMA-IOA) respectively in conjunction with two separate devices that have different resonant frequencies. The devices, which may be placed, for example, in a target liquid to be monitored, can be wirelessly interrogated through a remote interrogator, providing information about the two parameters.

Figure 16A:
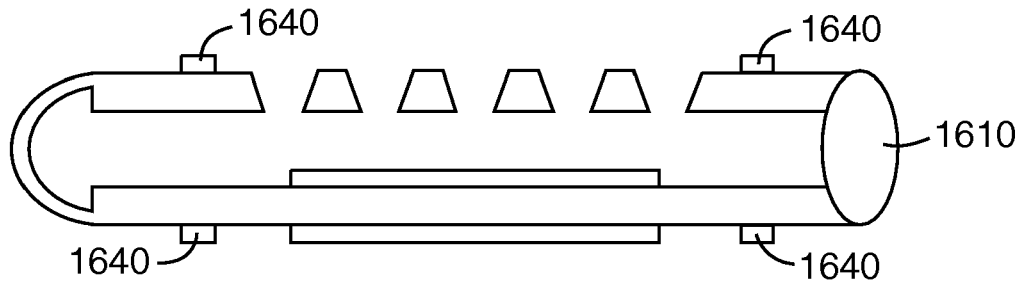
FIGS. 16A-16C show an inductive sensor including a mechanism for securing the sensor in an initial orientation in accordance with embodiments of the invention.
Figure 16B:
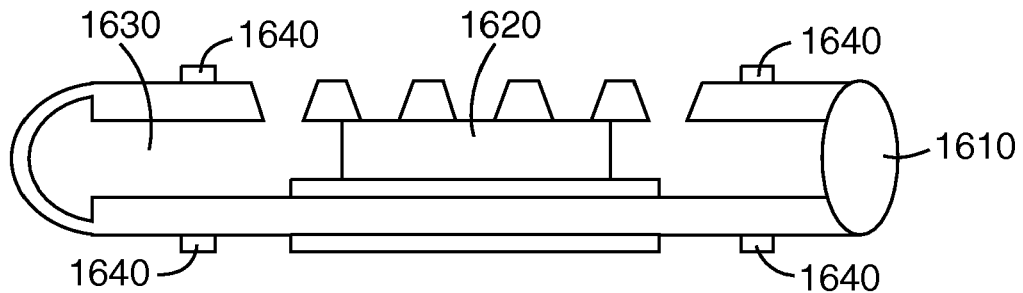
Figure 16C:
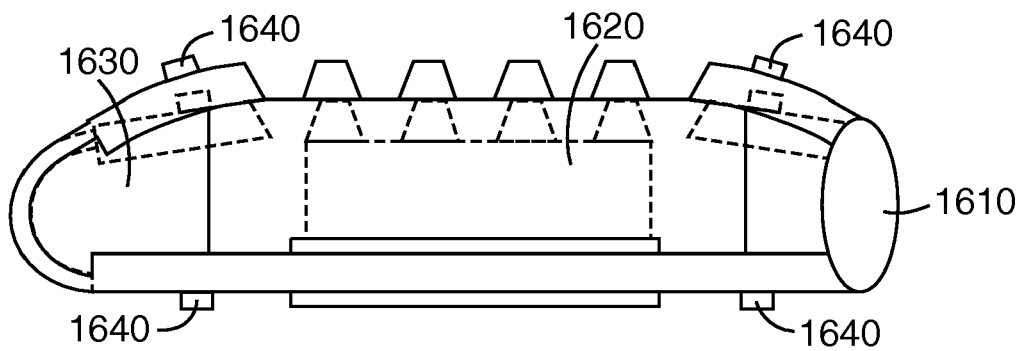

The inductive sensor fabricated using the processes described above may include a mechanism configured to secure the inductive sensor in an initial configuration after folding. FIGS. 16A-C illustrate one embodiment that includes a mechanism for securing the sensor. The sensor may be formed using the processes described above in connection with FIGS. 15A-H. FIG. 16A illustrates the sensor in an initial condition following flexure of the hinge formed by the thinned portion of the PI substrate. The ends of the substrate opposite the hinge may be coupled by a soft, elastic bonding material 1610, such as silicon rubber. The silicon rubber stabilizes the inductive sensor in an initial configuration. FIG. 16B shows the inductive sensor in an initial state prior to exposure to a parameter of interest, e.g. an analyte. A piece of dried hydrogel 1620 is disposed within the gap 1630 between the inductor loops 1640. The hydrogel 1620 is hydrated prior to exposure to the analyte. Exposure to the analyte or ambient condition, makes the hydrogel 1620 swell or de-swell, causing the distance between the inductor loops 1640 to change, as illustrated in FIG. 16C. The dashed lines in FIG. 16C indicate the configuration of the top portion of the device prior to exposure to the analyte. The solid lines in FIG. 16C indicate the configuration of the top portion of the device after swelling due to exposure to the analyte.

Figure 17A:
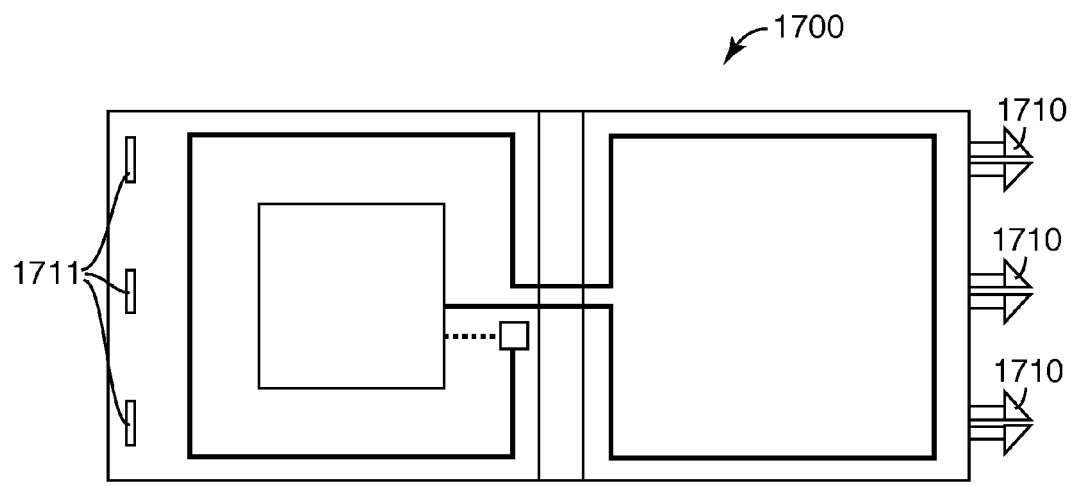
FIGS. 17A-17B show an inductive sensor including a latching mechanism in accordance with embodiments of the invention.
Figure 17B:
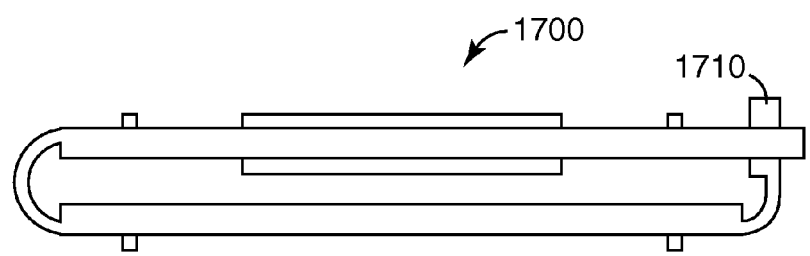

In some embodiments, latching the sensor is accomplished using a latching mechanism having complementary features that engage to secure the device in an initial configuration. For example the complementary features may be disposed on the ends or edges of the substrate. In one embodiment, the complementary features are disposed on the ends of the substrate opposite the hinge although other locations are possible. FIG. 17A depicts an inductive sensor 1700 prior to folding. The inductive sensor 1700 includes one or more hooks 1710 at one end of the substrate. The hooks 1710 are configured to engage one or more slits 1711 at the opposite end of the substrate. Engagement of the hooks 1710 and slits 1711 latches the inductive sensor in an initial configuration as illustrated in FIG. 17B. The lithography-based fabrication described in connection with FIG. 15A-H allows for the addition of latching structures with simple to complex patterns by modifying the mask layouts.

Figure 18A:
FIGS. 18A-18D depict a non-symmetric inductive sensor structure providing a leverage mechanism that amplifies displacement of the sensor material in accordance with embodiments of the invention.

As previously described in connection with FIG. 4B, pVA-pAA hydrogel having a particular composition was found to be soluble in water, becoming insoluble only after annealing. The solubility characteristic can be exploited in the assembly of the inductive sensor. FIGS. 18A-D illustrate an example of one such approach. In this embodiment, a piece of the soluble hydrogel 1810 is placed in the gap between opposing portions of the substrate 1821, 1822. Holes 1830 fabricated in one or both of the opposing portions of the substrate 1821, 1822 provide for exposure of the sensor material 1810 to moisture (FIG. 18A).

Figure 18B:

As illustrated in FIG. 18B, moisturizing the hydrogel 1810 surfaces with water 1831 via the holes 1830 dissolves and softens the moisturized regions of the hydrogel 1810. By applying pressure 1832 while the dissolved hydrogel 1810 dries, the hydrogel 1810 is extruded into the holes 1830, achieving physical coupling between the solidified hydrogel 1810 and the opposing portions 1821, 1822 of the substrate.

Figure 18C:
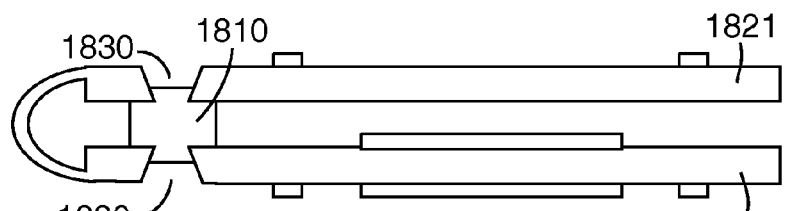

The device is annealed to make the hydrogel 1810 insoluble. FIG. 18C illustrates the device after annealing.

Figure 18D:
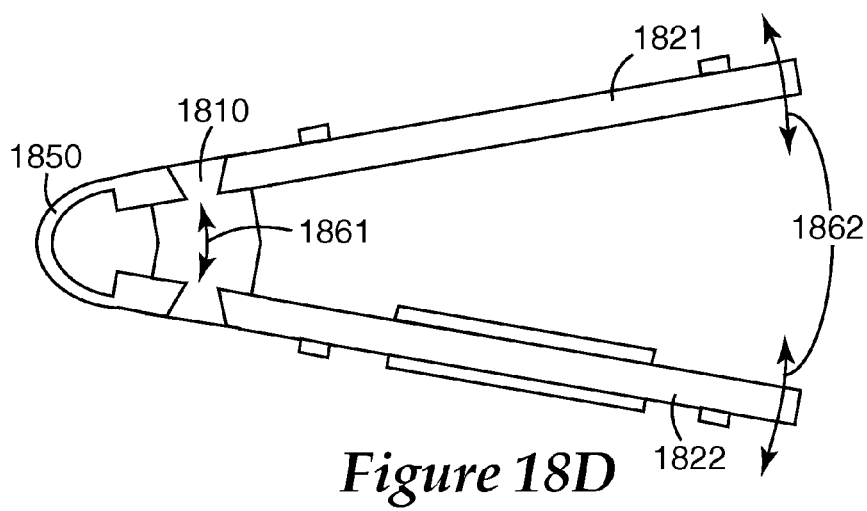

The inductive sensor illustrated in FIG. 18D illustrates a structure wherein the sensor material 1810 is oriented with respect to the hinge 1850 and the substrate portions 1821, 1822 to provide a leverage mechanism that amplifies the hydrogel's displacement 1861 in order to obtain larger displacement 1862 of the substrate portions 1821, 1822. The larger displacement 1862 of the substrate portions 1821, 1822 produces larger changes in the inductance value of the device and correspondingly larger signals when compared to devices without any mechanical amplification.

Figure 19:
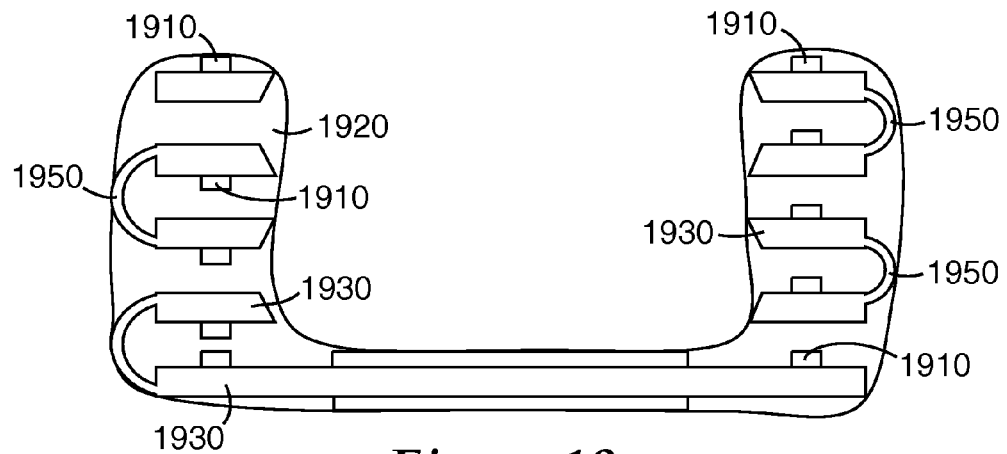
FIG. 19 illustrates a process for making an inductive sensor involving coating a folded multi-loop sensor with a liquid sensor material in accordance with embodiments of the invention.

A process for making the inductive sensor in accordance with another embodiment involves coating a multi-loop device with a liquid sensor material and allowing it to dry. For example, liquid hydrogel, or other sensor material in liquid form, may be coated over a multi-loop device, such as the folded multilayer device illustrated in FIG. 7B. The viscosity of the hydrogel allows the material to flow into the interstices between the folded layers. The hydrogel is then dried. Annealing is optional depending on the sensor material used. The resulting device is illustrated in FIG. 19. The sensor material 1920 is disposed between loops 1910 disposed on a substrate 1930 that has been folded at one or more hinges 1950. The sensor material 1920 expands and contracts based on the ambient conditions or exposure to an analyte. The expansion or contraction of the sensor material 1920 causes a change in the distance between the inductive loops 1910.

Any number of applications for the inductive sensors described herein may be envisioned. In one example, the inductive sensors can be employed in wound dressings or diapers to determine the moisture content of the wound dressings or diapers. For these products, it is advantageous to be able to determine, without removing the dressing, if the dressing or diaper has reached a moisture limit. Appropriately timing the replacement of the wound dressing or diaper reduces the possibility that the user will experience uncomfortable or deleterious conditions. The moisture content of the dressing or diaper may be remotely monitored using a device incorporating a resonant circuit having an inductive sensor as described herein. The devices can be fabricated in a batch manner and do not require an internal power source, such as a battery. These factors reduce the cost of the devices, making it practical to incorporate the devices into disposable products.

Figure 20:
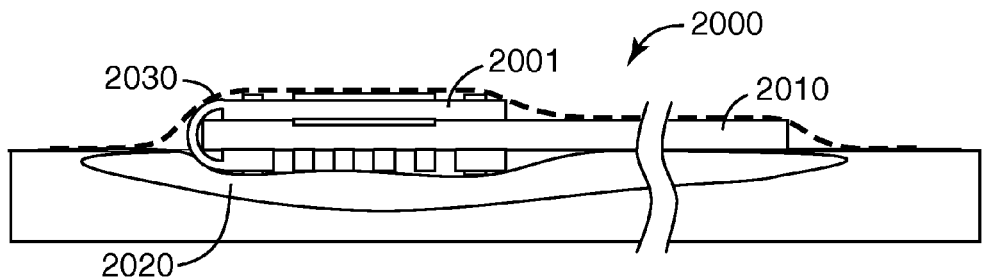
FIG. 20 illustrates a wound dressing incorporating an inductive sensor in accordance with an embodiment of the invention.

FIG. 20 illustrates a wound dressing 2000 incorporating an inductive sensor 2001. The dressing 2000 includes an absorbent material 2010 configured for placement on a wounded region 2020. The wound dressing 2000 is covered by a breathable protective film 2030. The wound dressing 2000 also includes a moisture sensor 2001 having a resonant circuit incorporating an inductive sensor as described herein. In some embodiments, the moisture sensor 2001 may be placed in, on, or near the absorbent material 2010 of the dressing 2000. In other embodiments, as illustrated in FIG. 20, the absorbent material 2010 may be used as the sensor material of the inductive sensor. As the absorbent material 2010 absorbs moisture, the absorbent material 2010 of the inductive sensor 2001 expands, causing a change in the inductance of the sensor 2001 and a corresponding change in the resonant frequency of the resonant circuit. The change in resonant frequency may be wirelessly detected by a remote interrogator. The interrogator or other circuitry may generate an alert when a moisture limit is reached, indicting that the dressing should be changed. As previously described, the interrogator may monitor multiple sensors that are fabricated to have different initial resonant frequencies for sensing multiple parameters. The use of multiple sensors allows for simultaneous sensing of multiple parameters. Alternatively, or additionally, multiple sensors may be used to provide compensation using one or more of the sensors as references.

As previously described, according to some embodiments, the inductive sensor need not use a sensor material to change the dimensions of the inductor. A change in the spacing between the inductive loops may be caused by pressure exerted on one or both of the loops. The use of inductive sensors that do not incorporate a dimensionally sensitive material are described in the next two application examples.

Figure 21A:
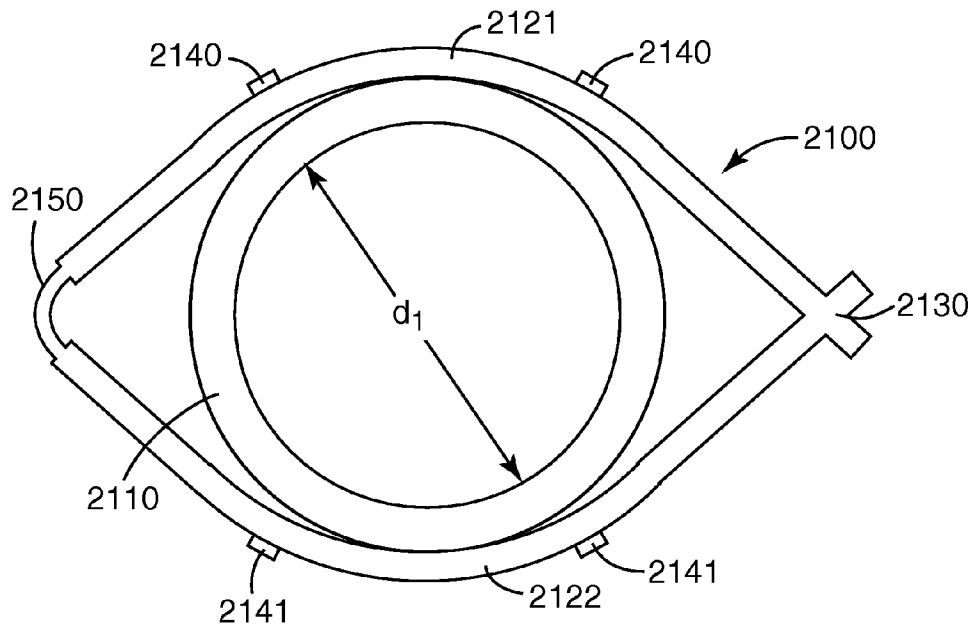
FIGS. 21A-21B illustrate a pulsatile flow sensor in accordance with embodiments of the invention.
Figure 21B:
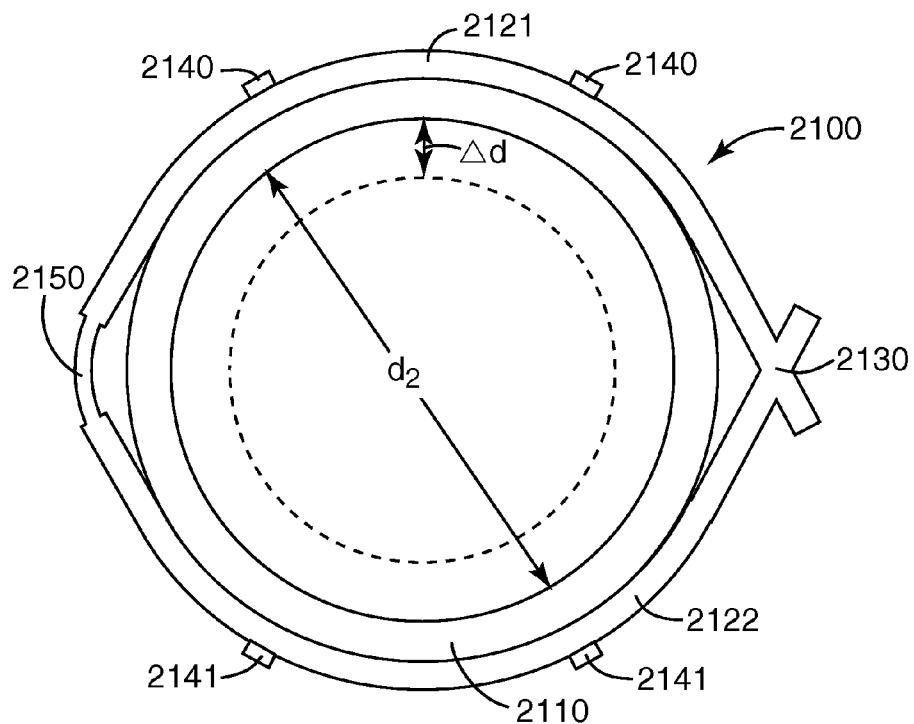

A hinged inductive sensor may be used for wireless monitoring of a parameter such as fluid flow. One example, illustrated in FIGS. 21A-B, uses an inductive sensor 2100 to measure a pulsatile flow of liquid (e.g., blood) running through a flexible tube 2110. In this application, the tube 2110 is loosely pinched by the first and second substrate portions 2121, 2122 of a sensing device 2100. The sensing device 2120 depicted in FIGS. 21A-B includes a latching mechanism 2130 and hinge 2150 that facilitates securing the device 2100 around the tube 2110. A change in the diameter of the tube 2110 causes a change in the distance between the inductive loops 2140, 2141. Pulsatile liquid flow causes periodic changes in the diameter of the tube 2110 and the resonant frequency of the device 2100. FIG. 21A illustrates the device 2100 at time $t_1$ when the tube 2110 has a first diameter $d_1$. FIG. 21B illustrates the device 2120 at time $t_2$ when the tube 2110 has a diameter $d_2$. The change in the diameter, $\Delta d$, of the tube 2110 causes a shift in the resonant frequency of the sensor device 2100. The flow rate may be determined by measuring the frequency of periodic changes in the resonant frequency corresponding to the periodic changes in tube diameter.

Figure 22:
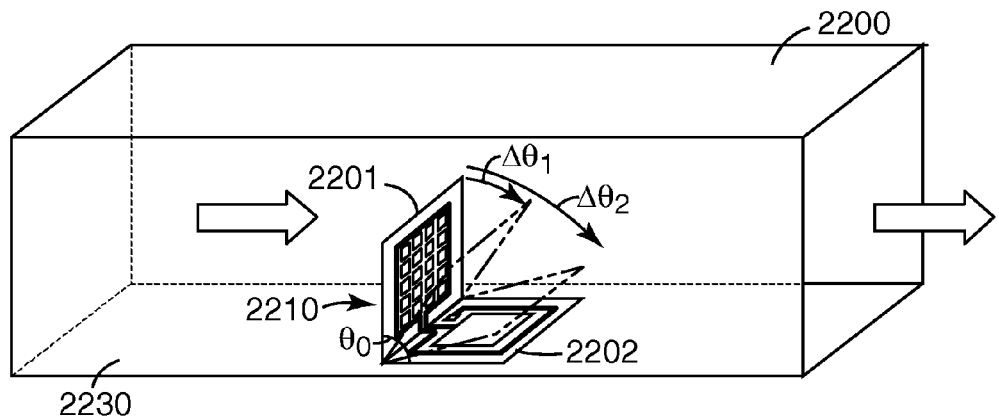
FIG. 22 illustrates an inductive sensor configured to measure fluid flow in a channel in accordance with embodiments of the invention.

In yet another exemplary application, shown in FIG. 22, the sensor device 2210 is used to measure the fluid flow in a channel 2200. The sensor device 2210 includes a hinge and is initially folded so that a one substrate portion 2202 is oriented at initial angle, $\theta_0$, with respect to another substrate portion 2201. One substrate portion 2202 is fixed on an inner wall 2230 of a fluidic channel 2200. The angle between the two substrate portions 2201, 2202 decreases as the free substrate portion 2201 is pushed downward due to pressure caused by the fluid flow. Lower flow rates produce a relatively smaller angular displacement, $\theta_1$, with respect to the initial orientation of the substrate portions 2201, 2202. Higher flow rates produce a relatively larger angular displacement, $\theta_2$, with respect to the initial orientation of the substrate portions 2201, 2202. Changes in the angular displacement between the substrate portions 2201, 2202, alters the inductance of the sensor, causing a shift in the resonant frequency. The resonant frequency shifts may be wirelessly accessed by a remote interrogator and correlated to the flow rate in the channel.

The foregoing description of the various embodiments of the invention has been presented for the purposes of illustration and description. It is not intended to be exhaustive or to limit the invention to the precise form disclosed. Many modifications and variations are possible in light of the above teaching. For example, embodiments of the present invention may be implemented in a wide variety of applications. It is intended that the scope of the invention be limited not by this detailed description, but rather by the claims appended hereto.

What is claimed is:

1. A sensor, comprising:
   an inductor comprising conductive loops and associated with an inductance;

one or more hinges mechanically coupling one or more pairs of the loops; and a sensor material configured to respond to a parameter of interest by a dimensional change of the sensor material, the sensor material oriented with respect to the loops so that the dimensional change of the sensor material causes a change in position of at least a first one of the loops relative to at least a second one of the loops and produces a change in the inductance of the inductor.

2. The sensor of claim 1, wherein at least one of the loops is disposed on a flexible substrate.

3. The sensor material of claim 1, wherein the one or more hinges comprise folds of a flexible material.

4. The sensor of claim 1, wherein the loops and the hinges are disposed on a unitary substrate.

5. The sensor of claim 4, wherein the unitary substrate is flexible and the hinges comprise thinned portions of the unitary substrate.

6. The sensor of claim 1, further comprising a latching mechanism configured to orient the first loop at an initial angle with respect to the second loop.

7. The sensor of claim 1, wherein:
the loops are oriented in a substantially parallel configuration having a distance between each pair of parallel loops; and
the change in position involves a change in distance between the parallel loops.

8. The sensor of claim 1, wherein:
at least two of the loops are oriented at an angle to one another; and
the change in position involves a change in the angle.

9. The sensor of claim 1, wherein the sensor material is disposed between at least some of the loops.

10. The sensor of claim 1, wherein the sensor material comprises hydrogel.

11. The sensor of claim 1, wherein at least one loop is disposed on a substrate having perforations configured to expose the sensor material to the parameter of interest.

12. The sensor of claim 1, wherein the parameter of interest comprises at least one of temperature, moisture, pH, fluid flow, salinity, solvent composition, glucose concentration, electric field, light, and ion concentration.

13. The sensor of claim 1, wherein the sensor includes a capacitor electrically coupled to the inductor to form a resonant circuit, wherein a change in the parameter of interest causes a change in a resonance characteristic of the resonant circuit.

14. A sensor, comprising an inductor comprising conductive loops, each conductive loop disposed on a planar substrate;
one or more hinges mechanically coupling at least one pair of the conductive loops so that operation of the one or more hinges changes the angular orientation of the loops, causing a corresponding change in the inductance of the inductor; and
a sensor material configured to respond to a parameter of interest by a dimensional change of the sensor material, the sensor material oriented with respect to the loops so that the dimensional change of the sensor material causes operation of the one or more hinges.

15. The sensor of claim 14, wherein the sensor material is disposed between the conductive loops.

16. A sensor system comprising:
an inductive sensor, comprising:
an inductor comprising conductive loops and associated with an inductance;
one or more hinges mechanically coupling one or more pairs of the loops; and
a sensor material configured to respond to a parameter of interest by a dimensional change of the sensor material, the sensor material oriented with respect to the loops so that the dimensional change of the sensor material causes a change in position of at least a first one of the loops relative to at least a second one of the loops and produces a change in the inductance of the inductor; and
sensor circuitry electrically coupled to the inductor to form a resonant circuit having one or more resonance characteristics dependent on the inductance; and an interrogator configured to detect a change in the resonance characteristics of the resonant circuit.

17. The sensor system of claim 16, wherein the interrogator is wirelessly coupled to the inductive sensor.

18. A method for making an inductive sensor, comprising:
forming a first loop of electrically conductive material on a first portion of a planar substrate, the substrate having at least a first portion, a second portion, and a flexible hinge portion connecting the first and second portions;
forming a second loop of electrically conductive material on the second portion of the substrate, the second loop electrically coupled to the first loop;
orienting a sensor material with respect to the substrate, the sensor material configured to respond to a parameter of interest by a dimensional change of the sensor material; and
folding the substrate at the hinge portion so that the sensor material is disposed between the first loop and the second loop and the first and second loops form coils of an inductor; and
perforating the substrate to allow exposure of the sensor material to the parameter of interest.

19. The method of claim 18, further comprising forming electrodes on the planar substrate, the electrodes configured to form opposing plates of a capacitor when the planar substrate is folded, the capacitor electrically coupled with the inductor to form a resonant circuit.

20. The method of claim 19, wherein the opposing plates of the capacitor are formed on opposing sides of the first or second portion of the substrate.

21. The method of claim 19, wherein at least one of the opposing plates is formed in sections to reduce eddy currents in the at least one plate.

22. The method of claim 19, wherein at least one of the opposing plates is formed inside one of the loops.

23. The method of claim 19, further comprising:
forming an additional loop of electrically conductive material on an additional portion of the substrate, the additional loop electrically coupled to the first and second loops, the substrate having an additional flexible hinge portion coupling the additional portion to the first or second portions; and
folding the substrate at the additional hinge.

24. The method of claim 18, wherein folding the substrate at the additional hinge comprises fan-folding the substrate.

25. The method of claim 18, further comprising depositing multiple loops of electrically conductive material on the first portion or the second portion, the multiple loops configured to form a multi-turn inductor when the substrate is folded.

26. The method of claim 18, wherein the planar substrate comprises a polyimide film.

27. The method of claim 18, wherein the hinge comprises a portion of the substrate having a thickness that is smaller relative to a thickness of the first or second portions.

28. The method of claim 18, wherein forming the first and second loops comprises forming the first and second loops using a photolithographic process.

29. The method of claim 18, further comprising:
   forming a latching mechanism on the substrate; and
   engaging the latching mechanism to latch the first and second portions in an initial angular orientation after folding.

30. A method for making an inductive sensor, comprising:
   forming a first loop of electrically conductive material on a first portion of a planar substrate, the substrate having at least a first portion, a second portion, and a flexible hinge portion connecting the first and second portions;
   forming a second loop of electrically conductive material on the second portion of the substrate, the second loop electrically coupled to the first loop;
   orienting a sensor material with respect to the substrate, the sensor material configured to respond to a parameter of interest by a dimensional change of the sensor material;
   folding the substrate at the hinge portion so that the sensor material is disposed between the first loop and the second loop and the first and second loops form coils of an inductor; and changing position of the first loop relative to the second loop in response to the dimensional change in the sensor material.

* * * * *

UNITED STATES PATENT AND TRADEMARK OFFICE
CERTIFICATE OF CORRECTION

PATENT NO. : 7,498,802 B2  Page 1 of 1
APPLICATION NO. : 11/456443
DATED : March 3, 2009
INVENTOR(S) : Kenichi Takahata It is certified that error appears in the above-identified patent and that said Letters Patent is hereby corrected as shown below:

Column 18,
Line 49, in claim 23, delete "claim 19" and insert -- claim 18 -- therefor.

Signed and Sealed this

Twenty-eighth Day of July, 2009

JOHN DOLL
*Acting Director of the United States Patent and Trademark Office*